United States Patent
Cheok et al.

(10) Patent No.: US 8,214,147 B2
(45) Date of Patent: Jul. 3, 2012

(54) NAVIGATION UNIT AND BASE STATION

(75) Inventors: Ka C. Cheok, Waterford, MI (US); Gert Edzko Smid, Oxford, MI (US); Paul W. Fleck, Troy, MI (US); Thomas P. Stiglich, Shelby Township, MI (US)

(73) Assignee: Nav-Track, Inc., Rochester, MI (US)

( * ) Notice: Subject to any disclaimer, the term of this patent is extended or adjusted under 35 U.S.C. 154(b) by 965 days.

(21) Appl. No.: 12/053,208

(22) Filed: Mar. 21, 2008

(65) Prior Publication Data
US 2008/0234930 A1    Sep. 25, 2008

Related U.S. Application Data

(60) Provisional application No. 60/896,108, filed on Mar. 21, 2007.

(51) Int. Cl.
*G01S 1/00*    (2006.01)
(52) U.S. Cl. .......................................................... 701/470
(58) Field of Classification Search .................. 701/200, 701/207, 213–215, 470
See application file for complete search history.

(56) References Cited

U.S. PATENT DOCUMENTS

| | | |
|---|---|---|
| 3,530,470 A | 9/1970 | Sheftelman et al. |
| 4,033,045 A | 7/1977 | Wing |
| 4,094,200 A | 6/1978 | Chombard |
| 4,136,394 A | 1/1979 | Jones et al. |
| 4,185,394 A | 1/1980 | Younkin |
| 4,229,737 A | 10/1980 | Heldwein et al. |
| 4,273,225 A | 6/1981 | Swanson |
| 4,397,555 A | 8/1983 | Malcolm et al. |
| 4,616,226 A | 10/1986 | Morley |
| 4,743,903 A | 5/1988 | Morley |
| 4,799,062 A | 1/1989 | Sanderford, Jr. et al. |
| 4,868,720 A | 9/1989 | Miyauchi et al. |
| 4,882,845 A | 11/1989 | Boyer |
| 4,943,158 A | 7/1990 | Pertl et al. |
| 4,988,192 A | 1/1991 | Knittel |
| 5,037,166 A | 8/1991 | Malcolm et al. |

(Continued)

FOREIGN PATENT DOCUMENTS

EP    0341812    11/1989

(Continued)

OTHER PUBLICATIONS

Canadian Intellectual Property Office action in Application No. 2554417 dated Jan. 29, 2010.

(Continued)

*Primary Examiner* — Hussein A. Elchanti
(74) *Attorney, Agent, or Firm* — EPIC Law PLLC; Hattem A. Beydoun

(57) ABSTRACT

The present invention relates to a navigation unit and base station used for determining location. A plurality of base stations are initialized to determine their location relative to each other. At the navigation unit, the time of arrival of at least one signal from each of the plurality of base stations is measured. From this, the location of the navigation unit relative to the plurality of base stations may be directly calculated using a closed solution. In one embodiment, a time of arrival technique is used and in another embodiment a time difference of arrival technique is used. Preferably an ultra-wide band frequency is utilized.

38 Claims, 4 Drawing Sheets

U.S. PATENT DOCUMENTS

| | | |
|---|---|---|
| 5,148,018 A | 9/1992 | Ammann |
| 5,218,355 A | 6/1993 | Burkhardt |
| 5,343,313 A | 8/1994 | Fergason |
| 5,400,244 A | 3/1995 | Watanabe et al. |
| 5,486,821 A | 1/1996 | Stevens et al. |
| 5,883,598 A | 3/1999 | Parl et al. |
| 5,901,172 A | 5/1999 | Fontana |
| 5,901,358 A | 5/1999 | Petty et al. |
| 5,966,680 A | 10/1999 | Butnaru |
| 6,021,330 A | 2/2000 | Vannucci |
| 6,042,533 A | 3/2000 | Kania |
| 6,054,950 A | 4/2000 | Fontana |
| 6,091,362 A | 7/2000 | Stilp et al. |
| 6,101,391 A | 8/2000 | Ishizuka et al. |
| 6,108,558 A | 8/2000 | Vanderspool, II |
| 6,160,616 A | 12/2000 | Ohtomo et al. |
| 6,167,275 A | 12/2000 | Oros et al. |
| 6,201,973 B1 | 3/2001 | Kowaguchi |
| 6,239,741 B1 | 5/2001 | Fontana et al. |
| 6,249,252 B1 | 6/2001 | Dupray |
| 6,300,905 B1 | 10/2001 | Chen et al. |
| 6,381,464 B1 | 4/2002 | Vannucci |
| 6,405,047 B1 | 6/2002 | Moon |
| 6,430,521 B1 | 8/2002 | Toda |
| 6,459,903 B1 | 10/2002 | Lee |
| 6,473,619 B1 | 10/2002 | Kong et al. |
| 6,477,379 B2 | 11/2002 | Kingdon |
| 6,490,456 B1 | 12/2002 | Bogdan et al. |
| 6,522,890 B2 | 2/2003 | Drane et al. |
| 6,539,229 B1 | 3/2003 | Ali |
| 6,556,832 B1 | 4/2003 | Soliman |
| 6,643,004 B2 | 11/2003 | Detweiler et al. |
| 6,658,258 B1 | 12/2003 | Chen et al. |
| 6,675,018 B2 | 1/2004 | Villier et al. |
| 6,675,800 B2 | 1/2004 | Keller |
| 6,690,741 B1 | 2/2004 | Larrick, Jr. et al. |
| 6,692,428 B1 | 2/2004 | Kania |
| 6,694,142 B1 | 2/2004 | Kuwahara et al. |
| 6,700,533 B1 | 3/2004 | Werb et al. |
| 6,812,884 B2 | 11/2004 | Richley et al. |
| 6,819,269 B2* | 11/2004 | Flick ........................ 340/989 |
| 6,882,315 B2 | 4/2005 | Richley et al. |
| 6,941,144 B2 | 9/2005 | Stein |
| 7,110,881 B2 | 9/2006 | Gray et al. |
| 7,132,982 B2 | 11/2006 | Smith et al. |
| 7,215,698 B2 | 5/2007 | Darby et al. |
| 7,239,277 B2 | 7/2007 | Fullerton et al. |
| 7,269,427 B2* | 9/2007 | Hoctor et al. ............. 455/456.2 |
| 7,286,624 B2 | 10/2007 | Woo et al. |
| 7,339,523 B2 | 3/2008 | Bye |
| 7,340,283 B1* | 3/2008 | Melick et al. ............. 455/562.1 |
| 7,403,783 B2 | 7/2008 | Cheok et al. |
| 7,409,220 B2 | 8/2008 | Belcea |
| 7,602,339 B2* | 10/2009 | Fullerton et al. ............ 342/463 |
| 7,636,062 B2* | 12/2009 | Ward et al. ................ 342/465 |
| 7,764,794 B2* | 7/2010 | Dacosta ..................... 380/270 |
| 7,880,608 B2* | 2/2011 | Richards et al. .......... 340/539.1 |
| 7,924,149 B2* | 4/2011 | Mendelson .............. 340/539.11 |
| 2001/0034223 A1 | 10/2001 | Rieser et al. |
| 2001/0046869 A1 | 11/2001 | Cedervall et al. |
| 2002/0034161 A1 | 3/2002 | Deneire et al. |
| 2002/0122003 A1 | 9/2002 | Patwari et al. |
| 2002/0132623 A1 | 9/2002 | Kingdon |
| 2002/0160787 A1 | 10/2002 | Chen et al. |
| 2002/0183071 A1 | 12/2002 | Shioda et al. |
| 2003/0008622 A1 | 1/2003 | Ferbabdez-Corbaton et al. |
| 2003/0069026 A1 | 4/2003 | Hoctor et al. |
| 2003/0090652 A1 | 5/2003 | Detwiler et al. |
| 2003/0096624 A1 | 5/2003 | Ormson |
| 2003/0144006 A1 | 7/2003 | Johansson et al. |
| 2003/0190920 A1 | 10/2003 | An |
| 2004/0158355 A1 | 8/2004 | Holmqvisst |
| 2004/0183673 A1 | 9/2004 | Nageli |
| 2005/0192024 A1 | 9/2005 | Sheynblat |
| 2005/0215269 A1 | 9/2005 | Cheok |
| 2005/0228613 A1 | 10/2005 | Fullerton et al. |
| 2006/0080004 A1 | 4/2006 | Cheok et al. |
| 2007/0032245 A1 | 2/2007 | Alapuranen |
| 2008/0024355 A1 | 1/2008 | Sun et al. |
| 2008/0103696 A1 | 5/2008 | Cheok et al. |
| 2008/0158062 A1 | 7/2008 | Fullerton et al. |
| 2008/0167051 A1 | 7/2008 | Cheok et al. |
| 2009/0212995 A1 | 8/2009 | Wu et al. |

FOREIGN PATENT DOCUMENTS

| | | |
|---|---|---|
| EP | 0269026 | 6/1993 |
| EP | 0729053 A2 | 8/1996 |
| EP | 0 936 829 A2 | 8/1999 |
| EP | 0 936 829 A3 | 5/2000 |
| EP | 1026476 A1 | 8/2000 |
| EP | 1292043 A1 | 3/2003 |
| EP | 0787972 B1 | 10/2003 |
| EP | 0829702 B1 | 11/2003 |
| EP | 1292043 A1 | 12/2003 |
| GB | 1206849 A | 8/1968 |
| GB | 2383216 A | 6/2003 |
| RU | 2062987 C1 | 6/1996 |
| WO | 92/08107 A1 | 5/1992 |
| WO | 92/19935 A1 | 11/1992 |
| WO | 92/20998 A1 | 11/1992 |
| WO | 96/01978 A1 | 1/1996 |
| WO | 00/14480 | 3/2000 |
| WO | 00/68907 A | 11/2000 |
| WO | 03/034168 A2 | 4/2003 |
| WO | 03/074970 A2 | 9/2003 |
| WO | 2005/081012 A1 | 9/2005 |
| WO | 2005/108924 A1 | 11/2005 |

OTHER PUBLICATIONS

US Office Action in U.S. Appl. No. 11/968,884 dated Aug. 24, 2010.
US Office Action in U.S. Appl. No. 11/857,700 dated Mar. 24, 2010.
US Office Action in U.S. Appl. No. 11/857,700 dated Aug. 3, 2010.
US Office Action in U.S. Appl. No. 11/968,884 dated Jan. 14, 2011.
US Office Action in U.S. Appl. No. 12/053,221 dated Aug. 31, 2010.
US Office Action in U.S. Appl. No. 12/053,221 dated Feb. 7, 2011.
International Search Report dated Apr. 25, 2005 for Serial No. PCT/US2005/004936, published as WO2005/081012 on Sep. 1, 2005.
Written Opinion of the International Searching Authority dated Apr. 25, 2005 for Serial No. PCT/US2005/004936, published as (WO2005/081012A1).
International Preliminary Report on Patentability dated Jan. 1, 2006 for Serial No. PCT/US2005/004936.
European Search Report dated Mar. 8, 2007, Application No. 05713670.7-2220.
Cheok "Intelligent Autonomous Behavior Techniques for Small Unmanned Ground Vehicle Systems", Proceedings of the International Conference on Intelligent Systems 2005, 2005, XP007904008 Kuala Lumpur Dec. 1-3, 2005 pp. 1-7.
International Search Report (PCT/US2007/079008) Sep. 20, 2007.
International Search Report dated Aug. 9, 2005 (PCT/US2005/015014) published as WO2005/108924.
"Spatial Disorientation—A Perspective", Alan J. Benson, published in RTO-MP-086.
"The Effectiveness of Various Attitude Indicator Display Sizes and Extended Horizon Lines on Attitude Maintenance in a Part-Task Simulation", J. Raymond Comstock, Jr., Leslie C. Jones, and Alan T. Pope, NASA Langley Research Center, Hampton, VA Virginia Tech, Blacksburg, VA.
"Digital Kalman Filter Implementation", Dec. 8, 1997.
International search report, PCT/US2008/057857, mailed Jul. 7, 2008.
Cheok et al., "Fuzzy Neighborhood Filters for UWB Range Radios in Multipath Environments," Mar. 16, 2007.
Cheok et al., "Ultra-Wideband Methods for UGV Positioning: Experimental and Simulation Results," Procs of the US Army Science Conference, Orlando, FL., Dec. 2006.
Copending Application, U.S. Appl. No. 11/857,700, filed Aug. 18, 2007.
International Search Report dated Jul. 7, 2008 for Serial No. PCT/US2008/057857, published as WO/2008/116168 on Sep. 25, 2008.
Written Opinion of the International Searching Authority dated Jul. 7, 2008 for Serial No. PCT/US2008/057857, published as WO/2008/116168 on Sep. 25, 2008.

Copending Application, U.S. Appl. No. 11/968,884, filed Jan. 3, 2008 published as 2008/0103696.
Copending U.S. Appl. No. 12/053,221, filed Mar. 21, 2008 published as 2008/0167051.
Written Opinion of the International Searching Authority dated Apr. 25, 2005 for Serial No. PCT/US2005/004936, published as WO2005/081012 on Sep. 1, 2005.
International Preliminary Report on Patentability dated Jan. 30, 2006 for Serial No. PCT/US2005/004936, published as WO2005/081012 on Sep. 1, 2005.
Korean Office Action dated May 1, 2008 for Korean Patent Appln. No. 2006-7016415(Korean National Stage for PCT/US2005/004936).
Non-Final Rejection in U.S. Appl. No. 11/059,911 (now issued as U.S. Patent No. 7,403,783) dated Sep. 27, 2007.
Final Rejection in U.S. Appl. No. 11/059,911 (now issued as U.S. Patent No. 7,403,783) dated May 3, 2007.
Final Rejection in U.S. Appl. No. 11/059,911 (now issued as U.S. Patent No. 7,403,783) dated Dec. 29, 2006.
Non-Final Rejection in U.S. Appl. No. 11/059,911 (now issued as U.S. Patent No. 7,403,783) dated Jul. 13, 2006.
The Patent Office of the People's Republic of China office action dated Aug. 14, 2009 for China Patent Application No. 200580005222.1 (China National Stage for PCT/US2005/004936).
"A study of wireless location based on mobile station" Zhang Yi, Luo Yuan, Wang Jifeng, and Li Zhu. Apr. 1, 2000. Abstract in English.
US Office Action in U.S. Appl. No. 12/324,310 dated Jun. 9, 2011.

* cited by examiner

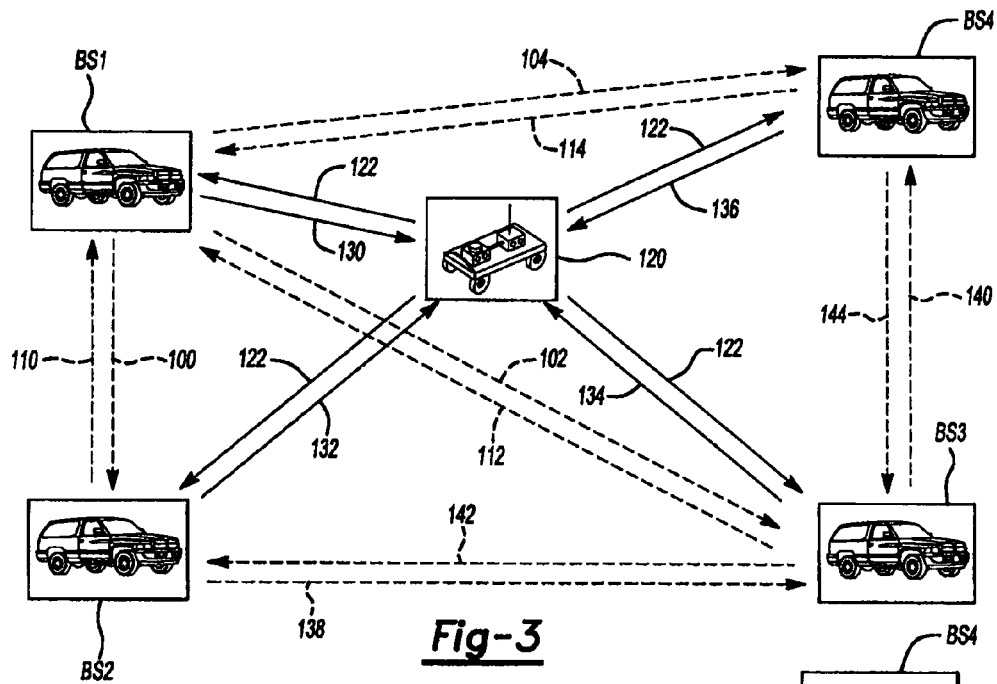
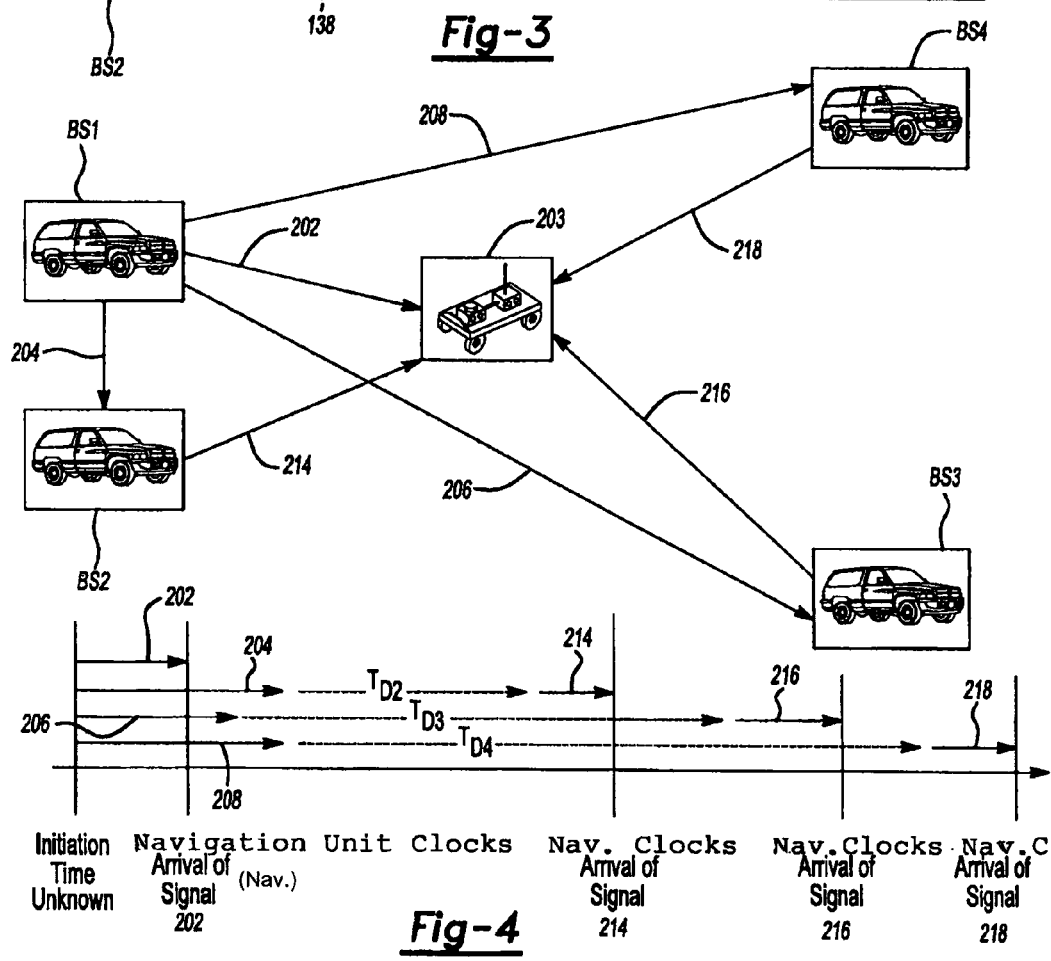

NAVIGATION UNIT AND BASE STATION

CLAIM OF PRIORITY

The present application claims the benefit of provisional application Ser. No. 60/896,108, filed Mar. 21, 2007, all of which is hereby incorporated by reference.

FIELD OF THE INVENTION

The present invention is for a navigation unit and a base station used in an ad hoc network during navigation and/or location. More particularly, navigation units and a base stations, some of which are preferably mobile, that use explicit closed-form triangulation calculations to determine the location of the navigation units and base stations.

BACKGROUND OF THE INVENTION

The Global Positioning System (GPS) is based on the fixed location base stations and the measurement of time-of-flight of accurately synchronized station signature transmissions. The base stations for the GPS are geo-stationary satellites and require atomic clocks for synchronization.

GPS has several draw backs including relatively weak signals that do not penetrate heavy ground cover and/or man made structures. Furthermore, the weak signals require a sensitive receiver. GPS also utilizes a single or narrow band of frequencies that are relatively easy to block or otherwise jam. The accuracy of the GPS system relies heavily on the use of atomic clocks, which are expensive to make and operate.

In addition, GPS utilizes a relatively slow update rate; on the order of once per second, which makes it ill suited for use in autonomous navigation of a vehicle. For example, a vehicle traveling at 10 kph would move about 2.75 m in a second. For an autonomous vehicle, significant changes in terrain may occur in this distance, making an update rate of once per second much too slow.

Known triangulation methods are also numerical in nature, meaning that no direct solution is available to find the location of the target. Rather, these open-form solutions provide only a initial guess and iterative numerical solution to estimate the location of the target. The resolution and accuracy of the location determination suffers accordingly. Further, using an open form solution in three dimensions is very difficult. There has not previously been a method to directly calculate the location of the target. Such a direct calculation would necessary increase the resolution and accuracy of the location determination.

The present invention overcomes one or more of these problems.

SUMMARY OF THE INVENTION

In a first aspect, the present invention contemplates a navigation unit comprising: a transceiver for transmitting and receiving ultra wideband signals, a central processing unit for performing operations, a power source for powering the transceiver and the central processing unit, and software stored on and executed by the central processing unit for diagnosing and managing the navigation unit, and for calculating position of the navigation unit using range measurements to and between a plurality of base stations, wherein the plurality of base stations is initialized to determine their relative locations to each other wherein, during initializing, a first base station of the plurality of base stations sends an ultra wideband signal to a second base station and a third base station of the plurality of base stations to determine a distance between the first base station and the second base station and a distance between the first base station and the third base station and wherein the second base station sends an ultra wideband signal to the third base station to determine a distance between the second base station and the third base station; determining the range measurements, at the navigation unit, by measuring the time of arrival of at least one ultra wideband signal from each of the plurality of base stations and calculating directly the location of the navigation unit relative to the plurality of base stations, where the plurality of base stations is at least three when a time of arrival technique is used and wherein the plurality of base stations is at least four when a time difference of arrival technique is used.

This aspect may be further characterized by one or any combination of the following features: the transceiver, the central processing unit, and the power source are contained within the same housing; the navigation unit further comprises a global positioning system receiver for determining the location of the navigation unit; the navigation unit communicates data using the ultra wideband transceiver; the data contains range measurements; the navigation unit further comprises an algorithm for determining accuracy of the navigation unit's position in relation to the plurality of base stations; the power source comprises a rechargeable battery; the power source comprises a wind turbine, solar panel, turbine, or generator; the software program monitors power level; the navigation unit further comprises a temperature sensor used for correcting variations in range measurement due to ambient temperature; the navigation unit further comprises a motion sensor used for detecting if the navigation unit has moved; the software program conserves power used by the navigation unit by entering the navigation unit into a low-power sleep mode; the navigation unit further comprises a direction indicator; the navigation unit further comprises health monitors; the navigation unit further comprises sensors for measuring ambient conditions; the navigation unit uses an explicit closed-form triangulation calculation to determine the location of the navigation unit; the navigation unit further comprises a separate communication link for communicating data; the communication link is a wireless modem; the navigation unit further comprises a motion sensor used for measuring the movement of the navigation movement.

In a further aspect, the present invention contemplates a base station comprising: a transceiver for transmitting and receiving ultra wideband signals, a central processing unit for performing operations, a power source for powering the transceiver and the central processing unit, and software stored on and executed by the central processing unit for diagnosing and managing the base station, wherein the base station transmits range measurements to one of a plurality of base stations and one or more navigation units, wherein the plurality of base stations is initialized to determine their relative locations to each other wherein, during initializing, the base station sends an ultra wideband signal to a second base station and a third base station of the plurality of base stations to determine a distance between the base station and the second base station and a distance between the base station and the third base station and wherein the second base station sends an ultra wideband signal to the third base station to determine a distance between the second base station and the third base station; determining the range measurements, at the base station, by measuring the time of arrival of at least one ultra wideband signal from each of the plurality of base stations; and transmitting, at the base station, the range measurement to the requesting base station or navigation unit.

This aspect may be further characterized by one or any combination of the following features: the transceiver, the central processing unit, and the power source are contained within the same housing; the base station further comprises a global positioning system receiver for determining the location of the base station; the base station communicates data using the ultra wideband transceiver; the power source comprises a rechargeable battery; the power source comprises a wind turbine, solar panel, turbine, or generator; the base station further comprises an interface for entry of the location of the base station; the software program monitors power level; the base station further comprises a temperature sensor used for correcting variations in range measurement due to ambient temperature; the base station further comprises a motion sensor used for detecting if the base station has moved; the software program conserves power used by the base station by entering the base station into a low-power sleep mode; the base station further comprises a direction indicator; the base station further comprises health monitors; the base station further comprises sensors for measuring ambient conditions; the base station further comprises a separate communication link for communicating data; the separate communication link is a wireless modem; the base station further comprises a motion sensor for measuring the movement of the base station.

The present invention relates to a navigation unit and a base station used for determining the location of a target unit (TU) in an ad hoc, and preferably mobile, manner using a method that employs an explicit closed-form triangulation calculation. The method includes initializing a network of at least three base stations (BS) to determine their relative location to each other in a coordinate system. The navigation unit then measures the time difference of arrival of at least one signal from each of three base stations. From the time difference of arrival of signals from the base stations, the location of the target on the coordinate system can be calculated directly. The invention further relates to components and system that embody the disclosed methods.

Overview. The ad hoc network discussed herein is a wireless radio network for determining a target location with high positioning accuracy and fast update rate. Such a network includes multiple base stations and at least one target unit, linked together with via high frequency ultra-wide bandwidth (UWB) wireless ranging and communication (RAC) transceivers and location schemes. The UWB RAC scheme ensures the desired accuracy in distance measurements and station identification. The location schemes employ fast direct closed-form solutions for self-organizing local and global geographic (e.g. GPS) coordinate systems, and determining position of base stations and targets within the desired coordinate system.

Gigahertz UWB. The ad hoc network utilizes gigahertz UWB radio transceivers to provide ranging and communication information among base stations and navigation units.

UWB Methods. The UWB ranging and communication scheme may employ one or more of the following techniques: Time division multiple access (TDMA), frequency division multiple access (FDMA) or code division multiple access (CDMA). A direct sequence (DS)-CDMA scheme is a preferred UWB scheme for providing ranging resolution and identification of base stations and navigation units.

Chiprate & Resolution. The UWB RAC scheme preferably operates at giga-bits/sec (Gbits/s) chip rate and is capable of yielding centimeter resolution in range measurements at a rate of several thousand updates per second. For example, a range resolution of approximately 30 cm is achievable with a 1 Gbits/s chiprate; 3 cm resolution with 10 Gbits/s chiprate.

Over-sampling & Resolution. The invention also includes a method of employing high speed digital or analog over-sampling and signal processing to increase the resolution in the range measurements in the DS-CDMA scheme. For example, a 1 Gbits/s signal sampled at 10 Giga-samples per second (GS/s) and correlated at 10 GHz rate yields an 3 cm range resolution.

Radio Penetration. The high frequency UWB spectrum also penetrates through objects including buildings, ground cover, weather elements, etc., more readily than other narrower bandwidth signals such as the GPS. This makes UWB advantageous for non-line-of-sights, and less susceptible to multipath and canopy problems.

Distributed Power Spread Spectrum. The bandwidth of UWB signals may range from approx 100 MHz to 10 GHz or more, which means that the power of the signals may be distributed almost evenly over the wide spread spectrum. The power spectral density of UWB signals has similar appearance to that of a random noise spectrum, and hence, often makes the UWB signals undetectable or ambiguous. UWB signals thus have desirable low probability interference and low probability detection characteristics.

UWB versus Narrowband Disturbance. The wide spread spectrum also makes it difficult for signals with lesser bandwidth to corrupt the UWB signals. This would be a desirable characteristics in the case of on deliberate jamming by a narrowband broadcast or disturbances.

Non-ambiguous Station Identification. The ad hoc network utilizes base stations equipped with UWB transceivers. The base stations communicate with each other and uniquely identify themselves. The identity is encoded with transmitted UWB signals. A base station correlates a received signal with the base station that sent it, and thus alleviating any ambiguity about the identity of transmission sources.

Self-Organization of Base Station Local & Global Coordinates. The base station locations in the ad hoc network may be fixed or mobile. The network will automatically establish the coordinates of the BS with respect to a local coordinate system. The network may be set up with BSs at desired locations in a matter of minutes. The network may also determine the global geographical coordinates by combining the local coordinates with GPS coordinates of base stations. Ad hoc network therefore provides both local & global coordinate frame references.

Target/Navigation Unit Coordinates. The location of a navigation unit will be referenced to the local and/or global coordinate frames established for the base stations.

Time-of-Arrival (TOA). In a time-of-arrival (TOA) method, a navigation unit broadcasts a UWB transmission to the base stations. The TU then waits and receives returning UWB replies from each of the base stations. It clocks the time-of-arrivals of returning UWB replies and the clocked times are converted to the distances from the navigation unit to each of the base stations. A closed-form solution to the triangulation problem is used to ensure fast calculation of the location of the TU.

Time-Difference-of-Arrival (TDOA). In a time-difference-of-arrival (TDOA) method, the navigation unit unit only receives UWB transmissions from the base stations; it does not transmit. A pre-arranged master base station broadcasts an initial UWB transmission to designated slave base stations & the navigation units. The slave BS then take turns to also transmit their own UWB signals to the TUs. The navigation unit clocks the time of arrivals of the transmission from the master and slave base stations. The known differences in the measured times of arrivals becomes the key inputs to the TDOA triangulation problem. This invention embodies a novel explicitly expressed closed-form TDOA method that ensures fast calculation of the location of the navigation unit.

Advantageous. The main advantage of the Ad hoc network are 1) the ad hoc & mobile manner in which the base stations may be rapidly set up, 2) the high precision in determining the location of a navigation unit, 3) the fast update rate of the location calculations, 4) the high penetration property desirable for non line-of-sight applications, 5) higher tolerance to radio disturbances and resistant to jamming.

BRIEF DESCRIPTION OF THE DRAWINGS

In the drawings:

FIG. 3 illustrates a self-organizing scheme for establishing local & global coordinate system utilizing four base stations;

FIG. 4 illustrates a TDOA UWB RAC scheme for locating the navigation unit utilizing four base stations;

DETAILED DESCRIPTION

Figure 1:
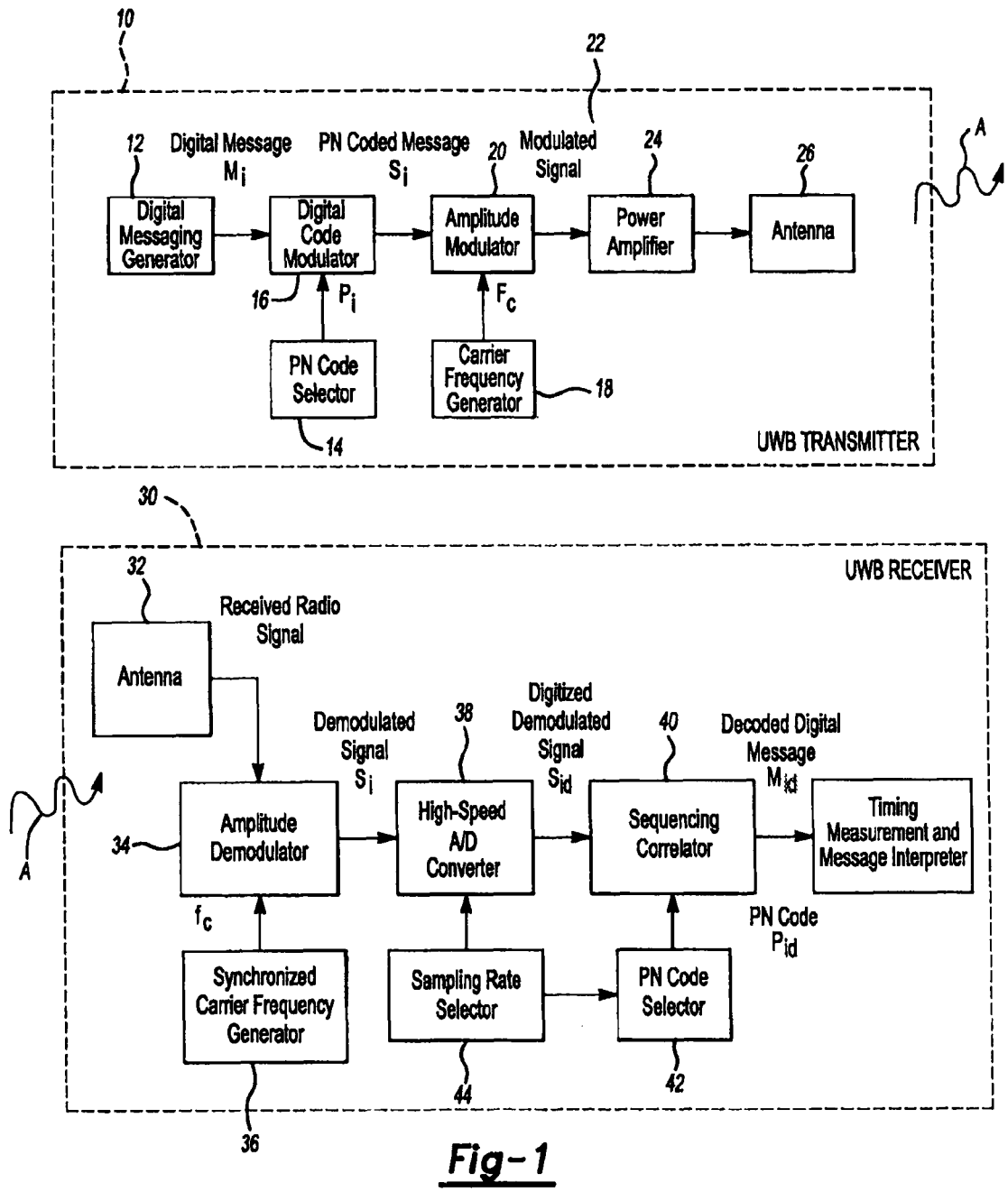
FIG. 1 illustrates the functional component of a UWB RAC transmission and receiving scheme.

The method of the present invention includes initializing a network of at least three base stations to determine their relative location to each other in a coordinate system; measuring, at the navigation unit, the time of arrival of at least one signal from each of three base stations, and then calculating the location of the navigation unit on the coordinate system can be calculated directly.

The initializing step utilizes at least three base stations and preferably at least four base stations. The base stations are transceivers that are capable of both receiving and transmitting signals. One of the base stations may be designated as the master station, as necessary. The master designation is arbitrary and may be shuttled amongst the base stations. In a preferred embodiment, the master designation resides on a single base station until that base station becomes deactivated (e.g. the base stations is powered down, loses communication with or travels out of range of the other base stations). The remaining base stations may be designated slave stations. Because the master designation is transferable among the slave stations, preferably each slave station is capable of acting as the master station.

The base stations, comprised of the master station and slave stations, may be stationary (whether permanently or temporarily) or mobile. Mobile base stations may be mounted to transportation vehicles such as automobiles, trains, boats, submarines, airplanes, helicopters, or the like. Base stations may also be mounted to non-transportation vehicles. Non-transportation vehicles include unmanned motorized vehicles. Non-transportation vehicles will typically be autonomous in that they are remotely controlled through wireline or wireless communication (e.g. an aerial drone or a mobile robot). Transportation vehicles used to house base stations may also be autonomous. Any suitable protocol may be used to communicate with an autonomous vehicle.

Mobile base stations may also be designed to be carried by an un-motorized vehicle, a pack animal or a human. As such, the base stations may be sized and shaped to be mounted to or contained within the desired transport, whether it is mounted to an automobile, carried by an aerial drone, carried in a backpack or built into a handheld unit. Preferably, the base stations are mounted to transportation vehicles. In a more preferred embodiment, at least one of the base stations is mounted to an autonomous vehicle.

The base stations may be stationary or in motion for any or all of the duration of the methods discussed below. Permanently fixed base stations may be suitable for certain applications; particularly where GPS is not suitable (e.g. within cities with tall building or within thick vegetation).

Due to the UWB frequency spectrum and thus its high penetration, placement of the base stations may not be critical. That is, the base stations and navigation unit may be non line-of-sight. Preferably, they should be placed such that the navigation unit remains within the volume circumscribed by the ranges of the base stations. While the distance between the base stations and the navigation unit is not critical, preferably the longest distance between a base station is less than about 100 KM, less than about 75 km, less than about 50 km, less than about 25 km, less than about 10 km, less than about 5 km, less than about 1 km or less than about 500 m. The signal power may suitably be selected to facilitate operation of the system any of these distances.

Each base station is capable of transmitting and receiving gigahertz high frequency UWB signals to communicate with other base stations and the navigation unit. The UWB signal is selected to reduce the interference from vegetative ground cover and from buildings, while also providing sufficient resolution in timing arrivals of signals. The UWB reduces problems associated with multi-path travel of signal because it tends to penetrate objects as opposed to being reflected. The high degree of penetration also means that the system incorporating UWB may be used successfully in non-line-of-sight applications, e.g. in urban settings or within a forest canopy. Furthermore, the UWB signals allow power of the signals to be spread over a gigahertz or more of frequency spectrum, thus making the signals very hard to detect, decode or jam. UWB signals may operate at the threshold of noise levels, meaning the signal's characteristics would look like those of sporadic noise to uninformed viewers. In broad terms, preferred carrier frequency for the UWB may be range from about 0.5 GHz to about 20 GHz, and the UWB may span between about zero and about 10 GHz.

To improve the accuracy of locations in the case where the navigation unit and the base stations are approximately in the same plane, at least one base station may be placed in a plane different than the remaining base stations. Further, additional base stations may be utilized to increase the accuracy of location determinations of the base stations and/or the navigation unit.

The initializing step uses either or both TOA or TDOA schemes to set up the network and determine the location the base stations, as discussed below.

In one embodiment, at least one of the base stations is portable but otherwise stationary for the duration of the step of calculating the location of the navigation unit. Preferably, at least one base station is stationary for the duration of all the steps of the method of determining the location of the navigation unit.

Figure 5:
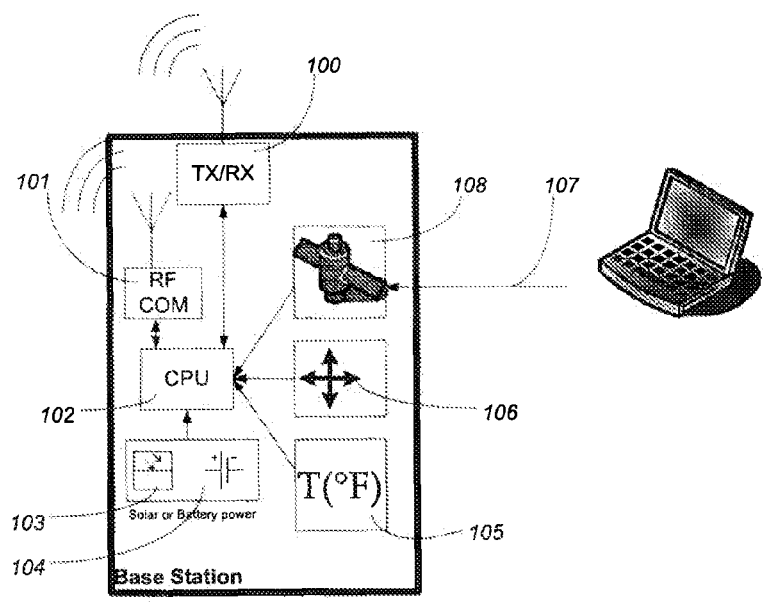
FIG. 5 illustrates one embodiment of the portable base station.

In one embodiment, the stationary base station in FIG. 5 comprises a UWB ranging radio 100, a GPS receiver 108, a CPU 102, and a power source 104 and optionally comprises one or more sensors 106 or 105 and/or a wireless communication interface 101 to communicate with a central command 120. The UWB ranging radio may include UWB receivers, transmitters or transceivers as discussed below to respond to requests for range measurements from other ranging radios that are within range of the radio such as the signals needed for TOA and/TDOA triangulation of the base stations and/or the navigation unit. The UWB ranging radio may also be used to transmit other information such as data.

The GPS receiver is any device that is capable of receiving signals from satellite based system that gives coordinates on a global coordinate system, such the GPS system or the Galileo global navigation satellite system in Europe. In addition to GPS only receivers, GPS receivers equipped with the ability to receive additional satellite or ground based signals are contemplated such those that utilize Wide Area Augmentation System (WAAS) or other differential GPS signals.

The CPU coordinates the activities of the other components and may include memory and storage of any required software or algorithms that are to be executed by the CPU. In particular, the CPU can coordinate the transmission of GPS data to the navigation unit so that the navigation unit can then locate itself in within the global coordinate system, not just in the local coordinate system.

The power source in FIG. 5 includes a source of electricity that is used by the other components to operate. The power source may include a power conditioning unit and/or a power storage unit 104. The power source may include a dc adaptor, a wind turbine, a battery 104 (rechargeable or otherwise), a fuel cell, a solar panel 103, a super capacitor, a gas or diesel powered generator, combinations thereof or the like. The CPU 102 may control the recharging of the power storage unit when there is excess power available.

Several different types of sensors may be included on the base stations including motion sensors 106 to alert if the base is moved after placement. Movement of the base station may require that the initializing of the base station be completed again (e.g. the GPS location of the base station needs to be re-acquired). Suitable motion sensors may include accelerometers or mercury sensors. Other optional sensors include temperature sensors 105 that may be used to correct for variations in ambient temperatures or for variations in temperatures of the components.

The wireless communications interface 101 is any device that can communicate data to another device wirelessly. While preferably digital, analog communications may also be used. In addition to the UWB communication technique discussed above, WiFi, WiMax, Bluetooth, similar techniques and, combinations thereof may also be used as part of the wireless communications interface.

FIG. 5 shows one embodiment of the base stations including optional motion sensors 106 and temperature sensors 105.

In operation, when the base stations are placed in an area where GPS signals are available, base station will automatically associates the acquired GPS location from the GPS receiver 108 with the base station's location. Ranging at least three base stations with known GPS locations now provide sufficient information for the navigation unit to calculate its 2D location. Where a base station does not have access to GPS signals (e.g. indoor), the base stations (through the CPU 102) can request an operator for its location through an operator interface 107, such as from a map, a floor plan, geospatial data or the like. Alternately, the base stations can conduct triangulation to at least three other base stations that do have access to GPS signals to compute its own location.

In one mode of operation, a sleep mode is utilized to conserve power. The CPU usually is always powered, but in a low-power sleep mode when not needed. The CPU may wake on a fixed time interval. Upon waking, the CPU direct the UWB ranging radio to wake up and listen for a period of time, primarily to determine if the base station is being commanded to come out of sleep mode. Upon such a command, the base station will not return to sleep mode, but return to normal operations. Such a command to wake could come from another base station (e.g. a master base station), the navigation unit, another control unit (e.g. a command center), or a combination thereof. In the absence of a command to wake, the CPU will return to the base station to the low power or sleep mode. This allows the base station to always remain powered 'on', but to operate in a mode such that the average power usage is low, with the majority of power only being expended when the UWB ranging radios are in use.

Moreover, sleep mode commands instructing the base station to enter sleep mode can also be sent from other base stations, the navigation unit, another control unit (e.g. a command center) or a combination thereof.

In addition, the base station may be commanded to come out of sleep mode upon a signal from a sensor (e.g. the motion sensor or the temperature sensor). For example, the base station may wake when the motion sensor determines that the base station has moved. The base station may also automatically enter sleep mode upon a period of inactivity of the CPU, UWB ranging radio or the sensors.

Suitable navigation units include receivers as well as transceivers. A navigation unit acting in receiver-only mode are preferred over those acting in transceiver mode because a receiver does not broadcast information that may be used to reveal its location and is thus more secure. Because the base stations are also transceivers, a navigation unit that includes a transceiver may also act as a base station. Navigation units are primarily mobile, although they may stationary for a given period of time. Permanently fixed navigation units are not preferred, but may be suitable given the right circumstances, such as during research and development activities.

The navigation units may be housed in similar types of mobile and fixed units as the base stations. Besides transportation vehicles, preferred navigation units may be included with non-transportation vehicles, both autonomous and otherwise. Exemplary non-transportation vehicles include lawnmowers, land mine sweepers and aerial drones. Preferably, the navigation units are mounted to autonomous non-transportation vehicles that may be used for surveillance or security applications. Navigation units may also suitably be constructed into backpack devices or handheld units. Of course multiple navigation units may be located using a single group of base stations.

An example of a preferred navigation unit will be included on a land mine sweeper that includes devices to provide self-propelled movement to the sweeper (e.g. a motor and wheels or tracks), mine detection sensors (e.g. metal detector or imaging systems), mine deactivation capabilities, mine location designation capability (e.g. flag, paint, etc.), on-board computer for data storage, computation and communication, combinations thereof, or the like.

Figure 6:
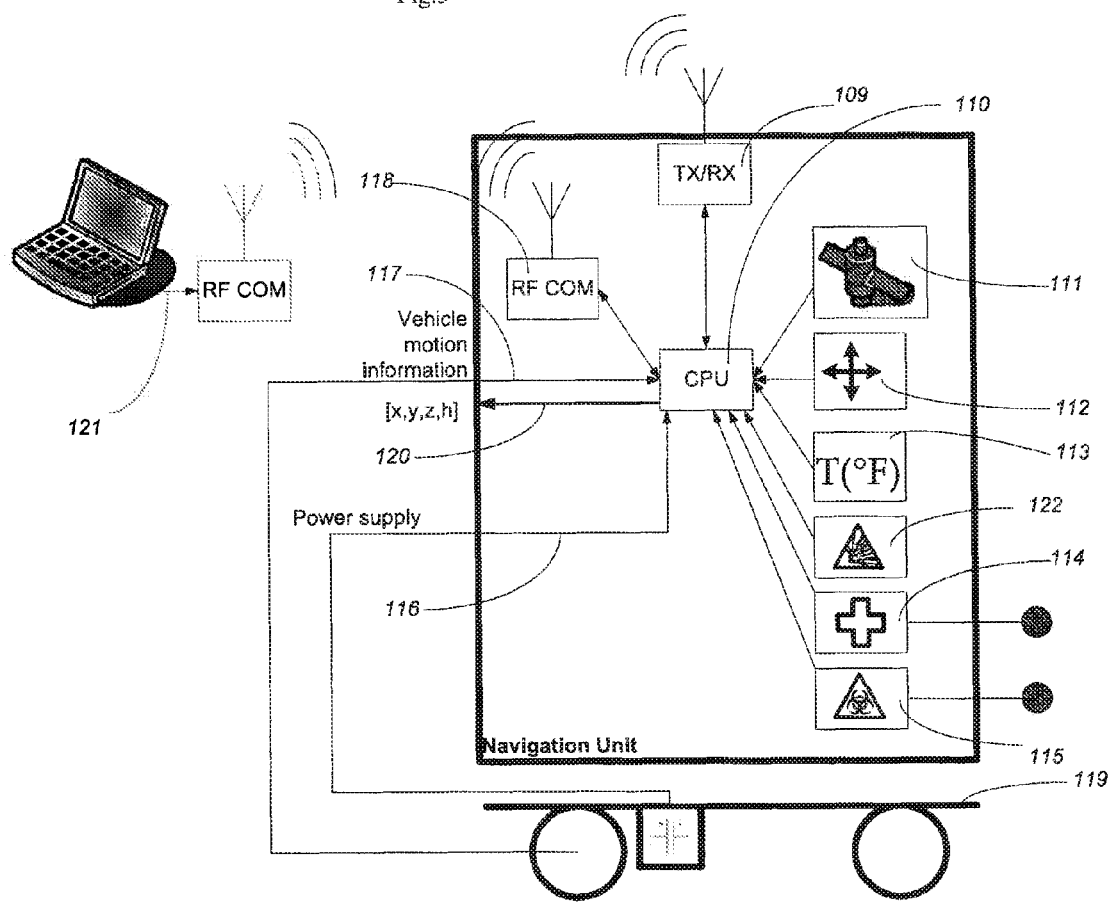
FIG. 6 illustrates one embodiment of the navigation unit.

An example of a preferred navigation unit is shown in FIG. 6, and will be included on a land mine sweeper 119 that includes devices to provide self-propelled movement to the sweeper (e.g. a motor and wheels or tracks) which can be monitored by the navigation unit through an interface 117, mine detection sensors 122 (e.g. metal detector or imaging systems), mine location designation capability (e.g. flag, paint, etc.), on-board computer for data storage, computation and communication, combinations thereof, or the like.

In one embodiment, the navigation unit is a personnel locator that is small enough to be carried by a first responder such as a police office, a firefighter, an EMT or the like. In this embodiment, the personnel locator would compromise a UWB ranging radio (preferably 5 watts or greater in strength) capable of performing ranging measurements to other navigation units, base stations or command center and transmitting/receiving digital data to/from other navigation units, base stations or command center. Also included would be a cellular modem (preferably GSM) capable of transmitting/receiving both digital and voice data. An inertial measurement unit may be included that is capable of measuring rate of rotation in 3D, linear acceleration in 3D, and/or the earth's magnetic flux in 3D.

A sensor package for monitor ambient condition may be included. For example, having sensors for external temperature 113, percent oxygen, hazardous material detectors 115, or the like. A sensor package for monitor the health of the first responder 114 is also contemplated, such as sensors for breathing rate, heart rate, galvanic skin response, oxygen levels in the blood, oxygen tank pressure and the like. The sensor packages may be integral to the personnel locator or separate therefrom.

The personnel locator also preferably comprises a direction indicator that gives the user or another control unit (e.g. command center or combination thereof a sense of the direction (e.g. north/south/east/west) in which the user is facing or heading. This may be done visually, verbally, aurally or tactilely.

A CPU 110 coordinates the operation of the personnel locator along with its communications with other navigation units and base stations. Preferably, a CPU capable of floating point operations and of implementing Kalman filtering is utilized. A power source such a battery, super capacitor or the like is used to power the device.

Optionally, the personnel locator includes one or more ports to receive external equipment such as connections for a headset, a heads up screen or the sensor packages.

Preferably, the size of the packaging for the personnel locator is about the size of a deck of cards.

The operation of this device is similar to other navigation units. Preferably, the personnel locator would be part of the standard equipment set issued to the first responder, and could be incorporated into the protective clothing or equipment used by first responder; e.g. attached to the oxygen tank of a fire fighter or sewn into the firefighter's over coat.

An ad-hoc grid would be set up when the first responders enter a building, such by placing base stations at the corners of the building. In one embodiment, this grid is overlaid on a floor plan of the building. If no floor plan exists for the building then the command center will dynamically create a visual representation of the building based on the location information coming back from the first responders. In this way a command center can know the absolute location of all the first responders as well as the relative locations of the first responders to each other.

The cellular modem 118 permits the command center 121 to communicate with the first responders and would be able to direct the activities of the first responders in terms of combating a fire, directing first responders into or out of the building, directing first responders to people in need of help (e.g. other first responders).

The CPU 110 coordinates the operation of the personnel locator and may include software (e.g. embedded software) to do Kalman estimation of 3D location using outputs from the inertial measurement unit 112 and/or the 3D triangulation data from the UWB ranging radio 109. The output 120 being the best estimate of the 3-dimensional location of the device relative to some origin.

The CPU 110 also communicates with the UWB ranging radio 109 to transmit/receive digital data from other navigation units, base stations and/or the command center 121; controls the mode of the cellular modem 118 to allow both voice and data communications through the modem; and conducts signal processing and telemetry of the sensor packages (e.g. temperature 113, heart rate 114, oxygen level, etc.). The CPU also controls the power source 116.

The UWB ranging radio and other components would operate as described elsewhere.

The primary method for the command center to communicate with the first responder is via two way verbal communication using the cellular system. If the cell system becomes unavailable or non-functioning, then two way non-verbal communications would still work via transmitting/receiving digital data through the UWB ranging radios. For example, a heads up display could be used to give simply text commands (e.g. turn left, 10 feet ahead, turn right, etc.).

Various information coding schemes may be used in the transmitted UWB signals to carry the desired information. A first suitable coding scheme is the time-division multiple access (TDMA) technique where a timing scheme in a UWB pulse packet represents the coded signals transmission. A second suitable coding scheme is the frequency-division multiple access (FDMA) technique where a select set of multiple bands of frequencies represents the coded transmission channel. A third suitable coding scheme is the code-division multiple access (CDMA) techniques where a pseudorandom number (PN) modulates and codes a signal to be transmitted. Typical TDMA, FDMA and CDMA coded signals have wide spectrums in hundreds of megahertz (MHz). UWB TDMA, FDMA and CDMA coded signals would have spectrums spread between about zero and about 10 GHz.

In addition to transmitting and receiving messages, a coded UWB signal can be timed to provide a measurement of the range between base stations and navigation units. The premise is based on the advent of extremely high speed electronics. For example, a 1 Gbits/s clock tick would translate to a flight of about 0.2997925 meter by the radio wave, and a 10 Gbits/s would clock with a resolution of about 0.03 m. The arrival times of UWB signals may be clocked using a correlator or matched filter techniques to measure the ranges between base stations and navigation units with suitable resolutions.

Although TDMA, FDMA and CDMA schemes may be timed for ranging purposes, a preferred embodiment is the UWB signal that utilize a direct sequence code division multiple access (DS-CDMA) communications technique to transmit information. In particular, DS-CDMA utilizes PN codes to identify each transmitter within a system (e.g. the base stations and/or the navigation unit). The PN code allows the receivers and transceivers within a system to simultaneously identify and decode the signals from multiple transmitters in the system. Each receiver/transceiver in the system uses a PN correlator to match PN codes to particular transmitters. Preferably, each receiver/transceiver has one PN correlator for each transmitter in the system.

This invention provides an additional preferred embodiment for improving resolution of the DS-CDMA ranging scheme by introducing high speed over-sampling of acquiring of coded signals. The PN correlators are designed to operate at a clock rate that is multiple times faster than the chiprate of the UWB signal. When a coded DS-CDMA signal is sampled at a rate faster than the chip rate of the PN correlator, a higher ranging resolution can be achieved. For example, if the PN correlator chip rate is about 1 Gbits/s, and the coded signal is digitally acquired at the about 1 Gbits/s, then the possible range resolution is about 0.3 meters. If the same signal is sampled and acquired at about 10 giga-samples/sec (GS/s), for example, then the range resolution can be improved to about 0.03 meters or 3 cm. This embodiment is described in detail a later section.

FIG. 1 illustrates a preferred embodiment of the functionality of the DS-CDMA transmitter and receivers utilized in the present invention. The transmitter 10 includes a digital message generator 12 which provides the message to be transmitted, $M_i$. A PN code selector 14 generates a PN code, $P_i$, that uniquely identifies the transmitter. A digital code modulator 16 modulates the message, $M_i$, by the PN code, $P_i$, to obtain a PN coded message, $S_i$. An RF carrier frequency, $f_c$, produced by carrier frequency generator 18 is combined with the message, $S_i$, at an amplitude modulator 20 to produce a modulated signal 22. The modulated signal is passed to a power amplifier 24 and then to an antenna 26 to be broadcast, as shown by arrow A.

The receiver 30 likewise includes an antenna 32 to receive the broadcast signal, as shown by arrow A. The receiver antenna passes the received signal to an amplitude demodulator 34. The demodulator uses a synchronized carrier frequency, $f_c$, from a synchronized carrier frequency generator 36 to demodulate and retrieve the PN coded message, $S_i$, from the received signal. Optionally, a high speed A/D converter 38 may be used to obtain a digitized demodulated signal, $S_{id}$. A sequence correlator 40 will be used to match the received digitized demodulated signal, $S_{id}$, to the PN code, $P_{id}$, stored in transmitter's own PN code selector 42. A sampling rate selector 44 may be used to in conjunction with A/D converter and/or the PN code selector. Matching the PN codes marks the arrival of the received signal and the time of correlation is marked. The time of arrival may then be stored for later use or passed directly to a message interpreter. In either case, the time of arrival may be used in the calculation of distances or locations, as discussed below.

UWB Ranging & Communication

Pseudo-random Number (PN) Code. The PN code, $P_i$, which could be tens to hundreds of bits long, is the code that identifies with a particular base station. To maximize distinctions in correlation and minimize cross-talk interference, Gold, Golay, Barker or Walsh codes may be used for the PN codes.

Digital message. The digital message $M_i$ may carry preamble, identification, message codes or any other desired information. In practice, $M_i$ could be tens to hundreds of bits long.

Figure 2:
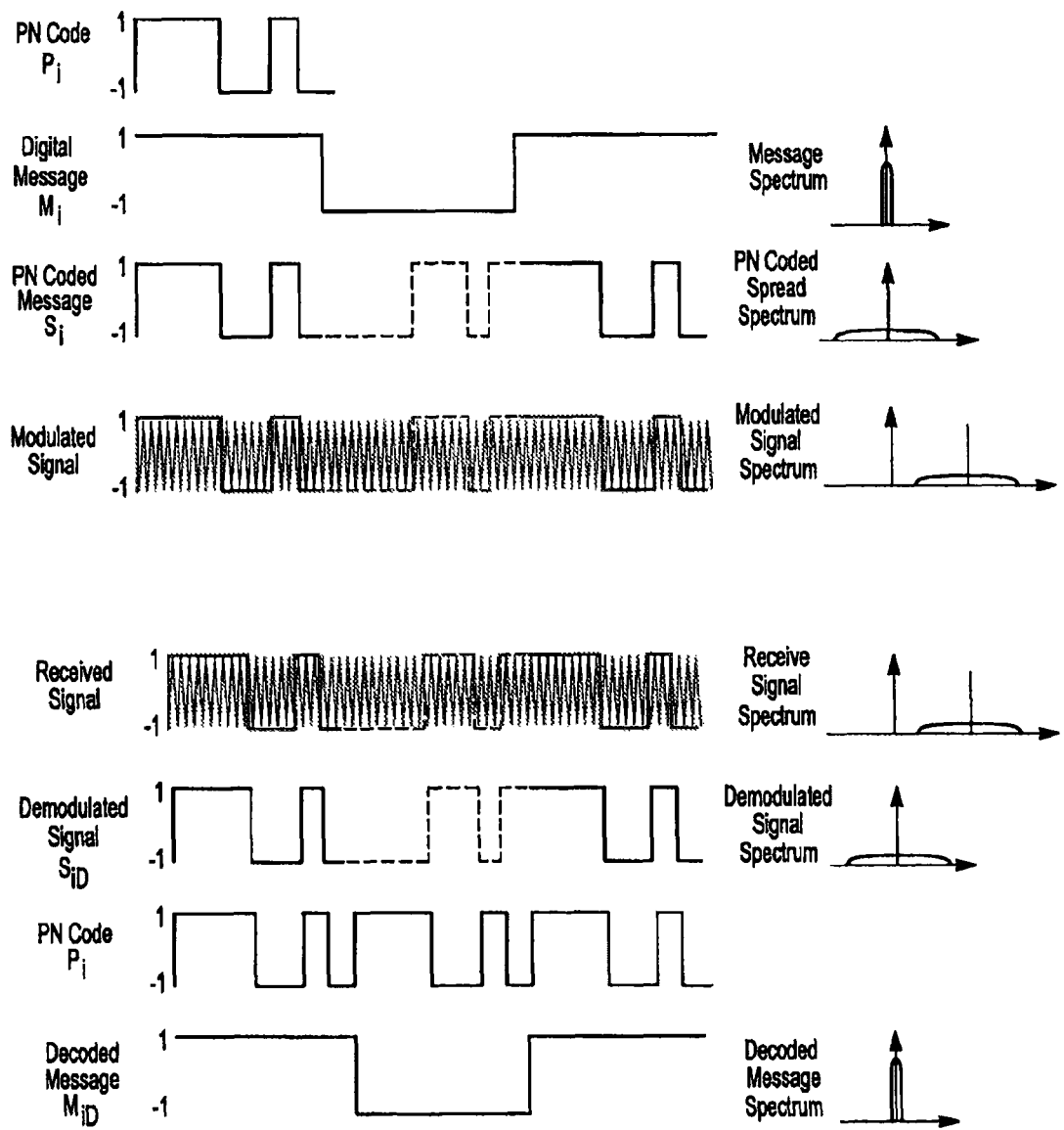
FIG. 2 illustrates an example of direct sequence CDMA with UWB signals.

Transmitter scheme. As an example, consider a digital message $M_i$=101 (+−+) and a PN code $P_i$=1110010 (+++−−+−), as shown in FIG. 2. Note that unipolar binary of "1" and "0" is converted to bipolar equivalence of "+" and "−". In the bipolar representation, a "0" would mean that there is no signal. The digital message $M_i$ modulates the amplitude of the PN code $P_i$. The PN coded message may be expressed as a Kronecker product of the digital message and the PN code; i.e., PN coded message $S_i$=kronecker($M_i$, $P_i$)=1110010 0001101 1110010 (+++−−+−−−−++−++++−+−). The $S_i$ then amplitude modulates a carrier signal for transmission.

Example rate. As an example of the above scheme, consider a digital message $M_i$ with a baud rate of 70 Mbits/s modulating a PN code $P_i$ with a chiprate of 350 Mbits/s. The resultant PN coded signal $S_i$ with a chiprate of 350 Mbits/s is then upconverted to an amplitude modulated signal with about a 2.5 GHz carrier frequency for wireless transmission.

Spread spectrum. The narrow frequency spectrum of the digital message $M_i$ is spread into an ultra-wide bandwidth spectrum of the PN coded message $S_i$. The UWB spectrum is shifted and centered at the carrier frequency $f_c$ to achieve an ultra-wide bandwidth spectrum for the modulated signal.

Receiver scheme. The receiver receives the transmitted signal, and demodulates the received signal into an analog demodulated signal $S_{iD}$. A threshold or edge detection synch technique may be used to trigger conversion of the analog demodulated signal into a digital demodulated signal $S_{iD}$(kT), where t=kT, T being the sampling interval and k is the time index. The sampled digital signal $S_{iD}$(kT) may then be correlated with the PN code $P_i$ to produce a decoded message $M_{iD}$.

Direct sequence correlation. If the sampling rate is chosen to be the same as the PN chiprate of 350 Mbits/s, i.e., the sampling rate of 350 MSamples/s, then a direct sequence correlation between the sampled decoded signal $S_{iD}$(kT) and the PN code $P_i$ may be performed. The shift registers, denoted by $D^{-1}$ in the figure, clocked at T, and thus hold the record $S_{iD}$(kT−T), $S_{iD}$(kT−2T), ..., $S_{iD}$(kT−6T). The sampled data $\{S_{iD}(kT-jT), j=0,1,2, \ldots, 6\}$ is multiplied by the reverse bits of PN code, i.e., $\{P_i(m), m=7,6,5, \ldots, 1\}$. The sum of the product is the output of the filter. The matched filter produces a positive or negative peak value when there is a match between the shifted coded data and PN code.

Direct sequence correlation resolution. The time resolution T translates to a range resolution of CT, C being the speed of light. In the case, the sampling interval T=1/350M sec, and so the resolution in clocking the time of arrival is T=2.8571 ns which translates to a ranging resolution of about 0.8566 meter.

Over-sampling sequence correlation. Alternatively, a higher speed digital threshold sampler may be used; for example, consider a digital sampler with 1.75 GS/s (gigasamples/sec) which is chosen to be five times the chiprate of 350 Mbits/s. The digital samples are then correlated with the PN code constructed at a new chiprate of 1.75 Gbits/s. The oversampled sequence $S_{iD}$(kT), $S_{iD}$(kT−T/$n_o$), $S_{iD}$(kT−2T/$n_o$), ..., $S_{iD}$(kT−($n_s$−1)T/$n_o$), $S_{iD}$(kT−T), $S_{iD}$(kT−($n_s$+1)T/$n_o$), etc is correlated with a stretched PN code $P_{i,7}$, 0, 0 ..., 0, $P_{i,6}$, 0, etc, at T/$n_o$ second interval, where $n_s$ is the number of over-sampling. In this case, the matched outputs may occur at T/$n_o$ sampling time interval. Therefore, the new over-sampling configuration provides $n_s$ times more resolution than the previous direct configuration.

Over-sampling sequence correlation resolution. The time resolution T/$n_o$ translates to a range resolution of CT/$n_o$, C being the speed of light. Therefore using the higher speed sampler and correlator in this way produces higher resolution in timing arrivals of signals; in this case the oversampling resolution is $n_s$ finer than that of the direct sampling. For example, when $n_o$=5 is used, the shift registers are clocked at T/5 second. The matched filter therefore produces an output every T/5 second. In the oversampling case, the sampling interval T=1/1.75 G sec, and so the resolution in clocking the time of arrival is T=0.5714 ns, translating to a ranging resolution of about 0.1713 meter, which is five times (1.75 G/350M) finer than 0.8566 meter, the case of direct sampling.

Over-sampling analog sequence correlation. Yet another alternative is the analog approach where the analog demodulated signal is sampled using a high-speed analog-to-digital converter (ADC); for example, an 8-bit ADC with a throughput of 1.75 GS/s. The sampled signal may then be correlated with the PN code constructed at a chiprate of 1.75 Gbits/s. The correlation decodes the sent message, yields higher resolution timing for arrivals of the signal, and also indicates the strength of received signal.

Time-of-Arrival & Time-Difference-of-Arrival Methods. Closed-form solutions for TOA and TDOA techniques are presented. Both techniques may be used for initializing the network of base stations to determine their relative locations of the base stations and for locating the navigation unit. Preferably a combination of the techniques is utilized in the overall system, with TOA utilized to initialize the base stations and TDOA to locate the navigation unit.

A TOA/TDOA Combination. In the embodiment described below, the relative locations of the base stations are determined through a TOA technique. These relative locations may optionally be combined with other information (e.g. GPS data) to provide global geographic locations. An explicitly expressed closed-form TDOA technique is then employed to calculate the location of the navigation unit.

Relative Locations of Base Stations

Designation of Base Stations. A preferred embodiment of the network uses four base stations designated as $BS_1$, $BS_2$, $BS_3$ & $BS_4$, with $BS_1$ arbitrarily selected as the master station. Additional base stations, $BS_5$, . . . , $BS_N$, may be readily appended.

TOA Range Measurement. To begin initializing the network, $BS_1$ will broadcast a UWB signal transmission to $BS_2$, $BS_3$ & $BS_4$. Upon receiving the signal, each base station waits for a predetermined time delay and replies with its own UWB signal transmission that identifies with the base station. $BS_1$ will clock the time-of-arrivals for the each of the replies from $BS_2$, $BS_3$ & $BS_4$ and record the total time-of-flight $T_{121}$, $T_{131}$ & $T_{141}$. As an a example, the total time-of-flight $T_{121}$ comprises: time-of-flight $T_{12}$ for the first signal transmission to go from $BS_1$ to $BS_2$; the delay $T_{D2}$ at $BS_2$; and $T_{21}(=T_{12})$, the time-of-flight for the reply transmission to go from $BS_2$ to $BS_1$. That is $T_{121}=T_{12}+T_{D2}+T_{21}$. Therefore the time of flight between $BS_1$ & $BS_2$ is $$T_{12} = \frac{(T_{121} - T_{D2})}{2}$$

and the distance between them is $l_{12}=C\,T_{12}$, where $C=2.99792458\times10^8$ nm/s is the speed of radio wave. The value of C used in this calculation may be changed to represent the change in the speed of light based on the ambient temperature, humidity and altitude.

The distances $l_{13}$ & $l_{14}$ between $BS_1$ & $BS_3$ and $BS_1$ & $BS_4$ can therefore similarly be determined using the TOA technique. Next, $BS_2$ will similarly broadcast its UWB signal transmission and clock the replies from $BS_3$ & $BS_4$. The distances from $BS_2$ to $BS_3$ and $BS_4$ are obtained as $l_{23}$ & $l_{24}$. Lastly, $BS_3$ will similarly broadcast its UWB signal transmission, clock the reply from $BS_4$, and calculate the distance $l_{34}$. This set of steps provides all the necessary information for determining the relative locations of the base stations.

In general, the TOA timing is given by $$T_{ij} = \frac{(T_{iji} - T_{Dj})}{2} \quad (1)$$

where time $T_{ij}$ for the radio transmission to go from $BS_i$ to $BS_j$, $T_{iji}$ is the total time-of-round trip flight and $T_{Dj}$ is the delay time at $BS_j$. The TOA range measurement is calculated from $$l_{ij}=CT_{ij} \quad (2)$$

C being the speed of radio wave propagation.

Local Coordinate Frame. The information obtained through the signal transmissions above may be utilized to determine location of the base stations on a local coordinate system. For convenience, a local Cartesian coordinate system is utilized, although other coordinate system may be appropriate: Let $$\begin{bmatrix} x_1 \\ y_1 \\ z_1 \end{bmatrix}, \begin{bmatrix} x_2 \\ y_2 \\ z_2 \end{bmatrix}, \begin{bmatrix} x_3 \\ y_3 \\ z_3 \end{bmatrix} \& \begin{bmatrix} x_4 \\ y_4 \\ z_4 \end{bmatrix}$$

be the coordinates of the location of $BS_1$, $BS_2$, $BS_3$ & $BS_4$. The location of $BS_1$ is assigned to be the origin; i.e., $x_1=0$, $y_1=0$ & $z_1=0$. $BS_2$ is assigned to be located on the x-axis of the coordinate system; i.e., $x_2=l_{12}$, $y_2=0$ & $z_2=0$. Next, $BS_3$ is assigned to be located on the xy-plane of the coordinate system; i.e., $z_3=0$. This completes the definition of the local coordinate frame.

Coordinates of BS's. The location coordinates $x_3$, $y_3$, $x_4$, $y_4$ & $z_4$ of $BS_3$ and $BS_4$, remains to be determined. It may be shown that the distances and the coordinates are related by $$l_{13}^2 = x_3^2 + y_3^2$$

$$l_{14}^2 = x_4^2 + y_4^2 + z_4^2$$

$$l_{23}^2 = (l_{12}-x_3)^2 + y_3^2$$

$$l_{24}^2 = (l_{12}-x_4)^2 + y_4^2 + z_4^2$$

$$l_{34}^2 = (x_3-x_4)^2 + (y_3-y_4)^2 + z_4^2 \quad (3)$$

From this relationship, the desired coordinates is thus given by $$x_3 = \frac{l_{12}^2 + l_{13}^2 + l_{23}^2}{2l_{12}} \quad (4)$$

$$y_3 = (l_{13}^2 - x_3^2)^{1/2}$$

$$x_4 = \frac{l_{12}^2 + l_{14}^2 + l_{24}^2}{2l_{12}}$$

$$y_4 = \frac{(x_3 - x_4)^2 + y_3^2 + l_{14}^2 - x_4^2 - l_{34}^2}{2y_3}$$

$$z_4 = (l_{34}^2 - (x_3 - x_4)^2 - (y_3 - y_4)^2)^{1/2}$$

This completes the determination of the local coordinates for $BS_i$, i=1, 2, 3 & 4.

Coordinates of additional BS's. The result is readily extended to additional $BS_i$, i=5, 6, . . . , N, where N is the total number of base stations. The distances $l_{1i}$, $l_{2i}$ & $l_{3i}$ from $BS_i$ to $BS_1$, $BS_2$ & $BS_3$ would be calculated on the TOA measurement technique already described above. By induction from equation (4), the coordinates of $BS_i$ would then be given by $$x_i = \frac{l_{12}^2 + l_{1i}^2 - l_{2i}^2}{2l_{12}} \quad (5)$$

$$y_i = \frac{(x_3 - x_i)^2 + y_3^2 + l_{1i}^2 - x_i^2}{2y_3} \quad i = 5, 6, \ldots, N$$

$$z_i = (l_{3i}^2 - (x_3 - x_i)^2 - (y_3 - y_i)^2)^{1/2}$$

Closed-form TOA method for local BS location. The formulas (1) & (2) are TOA range measurements from the signal transmission, which are then used in (4) & (5) to compute the coordinates of the base stations.

Kinematics. Global geographical locations of the base stations are related to the relative locations by a translation and rotation kinematic relationship as follows:

$$\begin{bmatrix} {}^G x_i \\ {}^G y_i \\ {}^G z_i \end{bmatrix} = \begin{bmatrix} d_x \\ d_y \\ d_z \end{bmatrix} + \begin{bmatrix} e_{11} & e_{12} & e_{13} \\ e_{21} & e_{22} & e_{23} \\ e_{31} & e_{32} & e_{33} \end{bmatrix} \begin{bmatrix} x_i \\ y_i \\ z_i \end{bmatrix} \quad (6)$$

where ${}^G x_i, {}^G y_i$ & ${}^G z_i$ denote geographical coordinates, $d_x, d_y$ & $d_z$ are the translation parameters, $e_{ij}$, i=1, 2, 3, j=1, 2, 3 represent the rotation transformation parameters and $x_i$, $y_i$ & $z_i$ are the relative coordinates determined earlier. The geographical coordinates ${}^G x_i, {}^G y_i$ & ${}^G z_i$ correspond to what is generally known as longitude, latitude and height of a location, whereas $x_i$, $y_i$ & $z_i$ are the local relative coordinates obtained using the methods of UWB RAC & TOA measurements.

GPS data. The translation and rotation parameters may preferably be determined by placing GPS receivers on three of the base stations, although only a single GPS receiver is required. For explanation purposes, suppose that GPS antennas are installed as close as possible to the transceivers of $BS_1$, $BS_2$ & $BS_3$. The global geographical coordinates of these base stations may be accurately determined by using precision GPS, or by calculating statistical mean of less precise GPS data when they are stationary. They would be denoted by $$\begin{bmatrix} {}^G x_1 \\ {}^G y_1 \\ {}^G z_1 \end{bmatrix}, \begin{bmatrix} {}^G x_2 \\ {}^G y_2 \\ {}^G z_2 \end{bmatrix} \& \begin{bmatrix} {}^G x_3 \\ {}^G y_3 \\ {}^G z_3 \end{bmatrix}.$$

Translation parameters. It is readily seen that the translation parameters simply equate to the GPS coordinates of $BS_1$, which is the origin of the local coordinate frame; i.e., $$\begin{bmatrix} d_x \\ d_y \\ d_z \end{bmatrix} = \begin{bmatrix} {}^G x_1 \\ {}^G y_1 \\ {}^G z_1 \end{bmatrix} \quad (7)$$

Rotational parameters. The rotation transformation parameters must satisfy $$\begin{bmatrix} {}^G x_2 \\ {}^G y_2 \\ {}^G z_2 \end{bmatrix} = \begin{bmatrix} d_x \\ d_y \\ d_z \end{bmatrix} + \begin{bmatrix} e_{11} & e_{12} & e_{13} \\ e_{21} & e_{22} & e_{23} \\ e_{31} & e_{32} & e_{33} \end{bmatrix} \begin{bmatrix} \ell_{12} \\ 0 \\ 0 \end{bmatrix} \quad (8)$$

$$\begin{bmatrix} {}^G x_3 \\ {}^G y_3 \\ {}^G z_3 \end{bmatrix} = \begin{bmatrix} d_x \\ d_y \\ d_z \end{bmatrix} + \begin{bmatrix} e_{11} & e_{12} & e_{13} \\ e_{21} & e_{22} & e_{23} \\ e_{31} & e_{32} & e_{33} \end{bmatrix} \begin{bmatrix} x_3 \\ y_3 \\ 0 \end{bmatrix} \quad (9)$$

and $$\begin{bmatrix} e_{11} & e_{12} & e_{13} \\ e_{21} & e_{22} & e_{23} \\ e_{31} & e_{32} & e_{33} \end{bmatrix} \begin{bmatrix} e_{11} & e_{21} & e_{31} \\ e_{12} & e_{22} & e_{32} \\ e_{13} & e_{23} & e_{33} \end{bmatrix} = \begin{bmatrix} 1 & 0 & 0 \\ 0 & 1 & 0 \\ 0 & 0 & 1 \end{bmatrix} \quad (10)$$

where the first two equations come from the location relationships of $BS_2$ & $BS_3$ and the last equation is the ortho-normal property of the rotation transformation matrix. The individual rotation parameters are thus given by $$e_{11} = ({}^G x_2 - d_x)/l_{12}$$

$$e_{21} = ({}^G y_2 - d_y)/l_{12}$$

$$e_{31} = ({}^G z_2 - d_z)/l_{12}$$

$$e_{12} = ({}^G x_3 - d_x - e_{11} x_3)/y_3$$

$$e_{22} = ({}^G y_3 - d_y - e_{21} x_3)/y_3$$

$$e_{32} = ({}^G z_3 - d_z - e_{31} x_3)/y_3$$

$$e_{13} = (1 - e_{11}^2 - e_{12}^2)^{1/2}$$

$$e_{23} = (1 - e_{21}^2 - e_{22}^{22})^{1/2}$$

$$e_{33} = (1 - e_{31}^2 - e_{32}^2)^{1/2} \quad (11)$$

Close-form method for global BS locations. The obtained translation and rotation parameters define a closed-form calculation for the desired transformation from the relative coordinates to the global geographical coordinates.

Local BS coordinates. Determining the location of the navigation unit may also be accomplished through the use of a TOA technique. The coordinate locations $$\begin{bmatrix} x_1 \\ y_1 \\ z_1 \end{bmatrix}, \begin{bmatrix} x_2 \\ y_2 \\ z_2 \end{bmatrix}, \dots, \begin{bmatrix} x_N \\ y_N \\ z_N \end{bmatrix}$$

of base stations are known, as determined from above.

Local TU coordinates. Let $$\begin{bmatrix} x \\ y \\ z \end{bmatrix}$$

be the coordinate location of the navigation unit with these coordinates to be determined.

TOA Range Measurements. In the TOA technique, the navigation unit has a transmitter & receivers to broadcast and receive signals from various base stations. The same TOA distance measurement method described above is applicable for determining the distance from a navigation unit to the base stations. The navigation unit broadcasts a UWB signal transmission, and waits for the replies from the base stations. For explanation purposes, consider the situation of the base stations: $BS_1, BS_2, \dots, BS_N$ where $r_1, r_2, \dots, r_N$ are the distances from the navigation unit to each of the base stations, respectively.

TOA Location Problem. The distance measurements are related to the coordinates of the navigation unit and the base stations as follows:

$$\begin{aligned} r_1^2 &= (x - x_1)^2 + (y - y_1)^2 + (z - z_1)^2 \\ r_2^2 &= (x - x_2)^2 + (y - y_2)^2 + (z - z_2)^2 \\ &\vdots \\ r_N^2 &= (x - x_N)^2 + (y - y_N)^2 + (z - z_N)^2 \end{aligned} \quad (12)$$

Expansion of the polynomial terms yields:

$$r_1^2 = x^2 - 2xx_1 + x_1^2 + y^2 - 2yy_1 + y_1^2 + z^2 - 2zz_1 + z_1^2 \quad (13)$$
$$r_2^2 = x^2 - 2xx_2 + x_2^2 + y^2 - 2yy_2 + y_2^2 + z^2 - 2zz_2 + z_2^2$$
$$\vdots$$
$$r_N^2 = x^2 - 2xx_N + x_N^2 + y^2 - 2yy_N + y_N^2 + z^2 - 2zz_N + z_N^2$$

The goal is to compute the location x, y & z of the navigation unit from the above relationship.

Closed-form TOA method for TU location. Manipulating the expanded equations, it can be shown that the coordinates of the navigation unit is given by $$\begin{bmatrix} x \\ y \\ z \end{bmatrix} = \frac{1}{2} \begin{bmatrix} (x_2-x_1) & (y_2-y_1) & (z_2-z_1) \\ (x_3-x_2) & (y_3-y_2) & (z_3-z_2) \\ \vdots & \vdots & \vdots \\ (x_1-x_N) & (y_1-y_N) & (z_1-z_N) \end{bmatrix}^{\#} \quad (14)$$

$$\begin{bmatrix} (x_2^2-x_1^2)+(y_2^2-y_1^2)+(z_2^2-z_1^2)-(r_2^2-r_1^2) \\ (x_3^2-x_2^2)+(y_3^2-y_2^2)+(z_3^2-z_2^2)-(r_3^2-r_2^2) \\ \vdots \\ (x_1^2-x_N^2)+(y_1^2-y_N^2)+(z_1^2-z_N^2)-(r_1^2-r_N^2) \end{bmatrix}$$

where $[\ ]^{\#}$ denotes a generalized Penrose pseudo-inverse of the matrix. This is the closed-form calculation for the local navigation unit coordinates based on a TOA technique.

Necessary condition. For N=3, the pseudo-inverse is the standard matrix inverse, i.e., $[\ ]^{\#}=[\ ]^{-1}$, For N>3, the pseudo-inverse is defined $[\ ]^{\#}=([\ ]^T[\ ])^{-1}[\ ]^T$, where $[\ ]^T$ denotes the matrix transpose. From the necessary condition of algebra, a solution for x, y & z exists only for cases where N≧3 and all the BS's are located at distinct locations. Therefore, the minimum number of base stations required to determine the location x, y & z of the navigation unit is 3. In practice, at least 4 base stations are desirable.

Summary of TOA method. FIG. 3 illustrates a TOA technique for locating the base stations and the navigation unit. First, the base stations are initialized. Base station 1, $BS_1$, acts as the master station and sends a signal 100, 102 and 104 to each of the slave stations, $BS_2$, $BS_3$ and $BS_4$. After a delay, each slave station sends a signal 110, 112 and 114 to the master station. The delay for each slave station is known to the master station. Slave stations also receive signals broadcast by other slave stations and rebroadcast those signal after the delay, as shown with signals 138 and 140 broadcast by $BS_2$ and $BS_3$, respectively, and rebroadcast as signals 142 and 144 by $BS_3$ and $BS_4$, respectively. The length of time for the signal round trip provides the distances between the base stations and their location through the calculation discussed above. After initialization, the navigation unit 120 sends a signal 122 which is received by each of the base stations. After a delay known to the navigation unit, the each base station sends a signal 130, 132, 134 and 136 to the navigation unit. Upon arrival at the navigation unit, the navigation unit can calculate its position through the calculation discussed above.

TDOA Method. Alternatively, determining the location of the navigation unit may also be accomplished through the use of a TDOA technique. Use of the TDOA technique is preferred, particularly when increased security is desired because the navigation unit need only have the capability to receive signals. By not transmitting signals, the navigation unit cannot reveal its location. In the TDOA method, the $$\begin{bmatrix} x_1 \\ y_1 \\ z_1 \end{bmatrix}, \begin{bmatrix} x_2 \\ y_2 \\ z_2 \end{bmatrix}, \ldots, \begin{bmatrix} x_N \\ y_N \\ z_N \end{bmatrix}$$

coordinates of base stations locations are known and $$\begin{bmatrix} x \\ y \\ z \end{bmatrix}$$

is the navigation unit with these coordinates to be determined.

TDOA Ranging Scheme. In the TDOA technique, the navigation unit need only receive signals and does not need to transmit signal, although it may do so. The designated master station $BS_1$ initiates and broadcasts a UWB signal transmission at time $T_0$, unknown to other base stations and navigation unit. Upon receiving the broadcast signal, each base station, $BS_i$, i=1, 2, ..., N waits for a predetermined time delay $T_{Di}$ and replies with its own UWB transmission signal that identifies the particular base station. The navigation unit will clock the arrival of the signals from each base stations as $T_i$, i=1, 2, ..., N.

TDOA Location Problem. The TDOA problem is to compute x, y & z from knowing the coordinates $$\begin{bmatrix} x_1 \\ y_1 \\ z_1 \end{bmatrix}, \begin{bmatrix} x_2 \\ y_2 \\ z_2 \end{bmatrix}, \ldots, \begin{bmatrix} x_N \\ y_N \\ z_N \end{bmatrix}$$

of base stations locations and the time measurements $T_i$, i=1, 2, ..., N.

TDOA Relative Distance Measurements. As before, let $r_1$, $r_2$, ..., $r_N$ are the distances from the navigation unit to $BS_i$, i=1, 2, ..., N, respectively, and $l_{12}, l_{13}, \ldots, l_{1N}$ from $BS_1$ to $BS_2, BS_3, \ldots, BS_N$. It is readily shown that the time-differences between the arrival times, $T_i$, i=1, 2, ..., N, translate to:

$$C(T_1 - T_0) = r_1 \quad (15)$$
$$C(T_2 - T_0) = l_{12} + CT_{D2} + r_2$$
$$\vdots$$
$$C(T_N - T_0) = l_{1N} + CT_{DN} + r_N$$

where C is the speed of light at a given temperature. The unknown variables in the above equation are $T_0, r_1, r_2, \ldots, r_N$.

Range difference. Define the differences in the ranges, $\Delta r_{i1}$, between the $BS_i$, i=2, ..., N, and $BS_1$ as:

$$\Delta r_{i,1} = r_i - r_1, i=2, \ldots, N \quad (16)$$

From the above relationship, it is seen that the distances between the navigation unit and the base stations may be represented as:

$$\Delta r_{i,1} = C(T_i - T_1 - T_{Di}) - l_{1i}, i=2, \ldots N \quad (17)$$

which may be computed based on predetermined parameters, $T_{Di}$ & $l_{1i}$, and measured time-difference of arrivals (TDOA) $T_i$-$T_1$. The computed measured quantity $\Delta r_{i,1}$ in (17) will be used in the TDOA method for calculating the location of the navigation unit.

Manipulation toward linear relationship (First key simplification). The geometric relationships are nonlinear in nature and are difficult to solve. A key contribution here is to reduce the nonlinear relationships into linear relationships by eliminating nonlinear terms. Note that squaring this formula results in:

$$\Delta r_{i,1}^2 = r_i^2 + r_1^2 - 2r_i r_1 \tag{18}$$

with a cross product term of $r_i r_1$. Also note that multiplying $\Delta r_{i,1}$ and $r_i$ also produces the cross term $r_i r_1$, as shown in:

$$\Delta r_{i,1} r_1 = r_i r_1 - r_1^2 \tag{19}$$

Next note that following combination of $\Delta r_{i,1}^2$, & $\Delta r_{i,1} r_1$ eliminates the cross term $r_i r_1$:

$$\begin{aligned}\Delta r_{i,1}^2 + 2\Delta r_{i,1} r_1 &= r_i^2 - r_1^2 \\ &= (x-x_i)^2 + (y-y_i)^2 + (z-z_i)^2 - \\ &\quad (x-x_1)^2 + (y-y_1)^2 + (z-z_1)^2 \\ &= x^2 - 2xx_i + x_i^2 + y^2 - 2yy_i + y_i^2 + z^2 - \\ &\quad 2zz_i + z_i^2 - (x^2 - 2xx_1 + x_1^2 + y^2 - 2yy_1 + \\ &\quad y_1^2 + z^2 - 2zz_1 + z_1^2) \\ &= x_i^2 + y_i^2 + z_i^2 - (x_1^2 + y_1^2 + z_1^2) - 2(x_i - x_1)x - 2 \\ &\quad (y_i - y_1)y - 2(z_i - z_1)z \end{aligned} \tag{20}$$

A compact form for the above expression may be written as $$\Delta r_{i,1}^2 + 2\Delta r_{i,1} r_1 = h_i^2 - 2\Delta x_{i,1} x - 2\Delta y_{i,1} y - 2\Delta z_{i,1} z \tag{21}$$

where $$h_i^2 = x_i^2 + y_i^2 + y_i^2$$

$$\Delta x_{i,1} = x_i - x_1$$

$$\Delta y_{i,1} = y_i - y_1$$

$$\Delta z_{i,1} = z_i - z_1$$

Linear relationships. The above manipulation results in a set of algebraic equations which is linear in x, y & z and $r_1$. Matrices may be used to solve these linear equations.

$$\begin{bmatrix} \Delta x_{2,1} & \Delta y_{2,1} & \Delta z_{2,1} \\ \Delta x_{3,1} & \Delta y_{3,1} & \Delta z_{3,1} \\ \vdots & \vdots & \vdots \\ \Delta x_{N,1} & \Delta y_{N,1} & \Delta z_{N,1} \end{bmatrix} \begin{bmatrix} x \\ y \\ z \end{bmatrix} = \frac{1}{2}\begin{bmatrix} h_2^2 - h_1^2 - \Delta r_{2,1}^2 \\ h_3^2 - h_1^2 - \Delta r_{3,1}^2 \\ \vdots \\ h_N^2 - h_1^2 - \Delta r_{N,1}^2 \end{bmatrix} + \begin{bmatrix} -\Delta r_{2,1} \\ -\Delta r_{3,1} \\ \vdots \\ -\Delta r_{N,1} \end{bmatrix} r_1 \tag{22}$$

Least squared error (LSE) estimate {want to avoid this phrase} of x, y & z The location x, y & z of the navigation unit is expressed in terms of $r_1$ as:

$$\begin{bmatrix} x \\ y \\ z \end{bmatrix} = \begin{bmatrix} \Delta x_{2,1} & \Delta y_{2,1} & \Delta z_{2,1} \\ \Delta x_{3,1} & \Delta y_{3,1} & \Delta z_{3,1} \\ \vdots & \vdots & \vdots \\ \Delta x_{N,1} & \Delta y_{N,1} & \Delta z_{N,1} \end{bmatrix}^{\#} \begin{bmatrix} -\Delta r_{2,1} \\ -\Delta r_{3,1} \\ \vdots \\ -\Delta r_{N,1} \end{bmatrix} r_1 + \tag{23}$$

$$\begin{bmatrix} \Delta x_{2,1} & \Delta y_{2,1} & \Delta z_{2,1} \\ \Delta x_{3,1} & \Delta y_{3,1} & \Delta z_{3,1} \\ \vdots & \vdots & \vdots \\ \Delta x_{N,1} & \Delta y_{N,1} & \Delta z_{N,1} \end{bmatrix}^{\#} \frac{1}{2}\begin{bmatrix} h_2^2 - h_1^2 - \Delta r_{2,1}^2 \\ h_3^2 - h_1^2 - \Delta r_{3,1}^2 \\ \vdots \\ h_N^2 - h_1^2 - \Delta r_{N,1}^2 \end{bmatrix} = \begin{bmatrix} a_x r_1 + b_x \\ a_y r_1 + b_y \\ a_z r_1 + b_z \end{bmatrix}$$

where:

$$\begin{bmatrix} a_x \\ a_y \\ a_z \end{bmatrix} = \begin{bmatrix} \Delta x_{2,1} & \Delta y_{2,1} & \Delta z_{2,1} \\ \Delta x_{3,1} & \Delta y_{3,1} & \Delta z_{3,1} \\ \vdots & \vdots & \vdots \\ \Delta x_{N,1} & \Delta y_{N,1} & \Delta z_{N,1} \end{bmatrix}^{\#} \begin{bmatrix} -\Delta r_{2,1} \\ -\Delta r_{3,1} \\ \vdots \\ -\Delta r_{N,1} \end{bmatrix}$$

$$\begin{bmatrix} b_x \\ b_y \\ b_z \end{bmatrix} = \frac{1}{2}\begin{bmatrix} \Delta x_{2,1} & \Delta y_{2,1} & \Delta z_{2,1} \\ \Delta x_{3,1} & \Delta y_{3,1} & \Delta z_{3,1} \\ \vdots & \vdots & \vdots \\ \Delta x_{N,1} & \Delta y_{N,1} & \Delta z_{N,1} \end{bmatrix}^{\#} \begin{bmatrix} h_2^2 - h_1^2 - \Delta r_{2,1}^2 \\ h_3^2 - h_1^2 - \Delta r_{3,1}^2 \\ \vdots \\ h_N^2 - h_1^2 - \Delta r_{N,1}^2 \end{bmatrix}$$

Necessary condition. The necessary condition for pseudo-inverse formulation in (23) to yield a unique solution is to have $N \geq 4$. This means that the TDOA method would require a minimum of four base stations to determine the location x, y & z of the navigation unit. In practice, more than 4 base stations are desirable.

Manipulation to quadratic form (Second key simplification). Expand the Euclidean distance relationship to yield another expression relating x, y & z and $r_1$.

$$\begin{aligned} r_1^2 &= (x - x_1)^2 + (y - y_1)^2 + (z - z_1)^2 \\ &= x^2 + y^2 + z^2 + x_1^2 + y_1^2 + z_1^2 - 2xx_1 - 2yy_1 - 2zz_1 \end{aligned} \tag{24}$$

Substituting the LSE relationship into the Euclidean relationship yields:

$$r_1^2 = (a_x r_1 + b_x)^2 + (a_y r_1 + b_y)^2 + (a_z r_1 + b_z)^2 - 2(a_x r_1 + b_x)x_1 - 2(a_y r_1 + b_y)y_1 - 2(a_z r_1 + b_z)z_1 + x_1^2 + y_1^2 + z_1^2 \tag{25}$$

This essentially is a quadratic polynomial equation of the form:

$$(a_x^2 + a_y^2 + a_z^2 - 1)r_1^2 - 2(a_x(x_1 - b_x) + a_y(y_1 - b_y) + a_z(z_1 - b_z))r_1 + (x_1 - b_x)^2 + (y_1 - b_y)^2 + (z_1 - b_z)^2 = 0 \tag{26}$$

Calculation of $r_1$. The polynomial equation may be expressed more compactly as $$ar_1^2 + br_1 + c = 0 \tag{27}$$

where $$a = a_x^2 + a_y^2 + a_z^2 - 1$$

$$b = -2(a_x(x_1 - b_x) + a_y(y_1 - b_y) + a_z(z_1 - b_z))$$

$$c = (x_1 - b_x)^2 + (y_1 - b_y)^2 + (z_1 - b_z)^2$$

The quadratic polynomial yields two answers for $r_1$.

$$r_1 = \frac{-b \pm \sqrt{b^2 - 4ac}}{2a} \tag{28}$$

Calculation of x, y & z. Selecting the positive answer for $r_1$ and compute the location of navigation unit as:

$$\begin{bmatrix} x \\ y \\ z \end{bmatrix} = \begin{bmatrix} a_x \\ a_y \\ a_z \end{bmatrix} r_1 + \begin{bmatrix} b_x \\ b_y \\ b_z \end{bmatrix} \quad (29)$$

Closed-form TDOA method for TU location. Formulas (17), (21), (23), (27), (28) & (29) define the explicit closed-form TDOA method for calculating the location of the navigation unit. The direct measure-and-calculate TDOA formulas enhance speed in processing. They represent a key embodiment of the invention.

Existing Approaches to TDOA Location Problem. It is noted that existing approaches to the TDOA problem have been limited to numerical approximation techniques such as the Taylor series nonlinear least squares iterative method. The method starts by guessing the location of the navigation unit, linearizing the nonlinear hyperbolic functions for the TDOA relationship, and using the least squares estimation technique to compute a new estimate of the navigation unit position. The process is repeated until the solution converges to a location. The approach is therefore indirect and lengthy, and may not converge to a true solution.

Summary of TDOA method. FIG. 4 illustrates a TDOA technique for locating the navigation unit. The positions of the base stations are known from the information gathered using the TOA method. The master station $BS_1$ broadcasts a signal 202 to the navigation unit 203; the same broadcast signal 204, 206 and 208 are also received by the slave stations $BS_2$, $BS_3$ and $BS_4$. The slave stations wait a set delay, $T_{D2}$, $T_{D3}$, $T_{D4}$, and re-send the signals 214, 216 and 218 to the navigation unit. Based on the difference in arrival times of each of the signals 202, 214, 216 and 218, the navigation unit can determine its own position according to the calculation discussed above. A schematic depiction of the arrival times of is shown at the bottom of FIG. 4.

Ranging & Positioning Errors. Accuracy in the measurement of ranges depends on several factors including hardware clock & delays, transmission model, etc. Each measured range can be expressed as the sum of its true range and its measurement error, i.e., $r_i + \Delta r_i$, $i=1, \ldots, N$. The position of the navigation unit can also be similarly expressed as $x + \Delta x$, $y + \Delta y$ & $z + \Delta z$, where $\Delta x$, $\Delta y$ & $\Delta z$ are the calculation errors. It follows from the least squares estimate formula (14) that the calculation errors are related to the measurements errors as $$\begin{bmatrix} \Delta x \\ \Delta y \\ \Delta z \end{bmatrix} = \tag{30}$$

$$\underbrace{\begin{bmatrix} (x_2 - x_1) & (y_2 - y_1) & (z_2 - z_1) \\ (x_3 - x_2) & (y_3 - y_2) & (z_3 - z_2) \\ \vdots & \vdots & \vdots \\ (x_1 - x_N) & (y_1 - y_N) & (z_1 - z_N) \end{bmatrix}^{\#} \begin{bmatrix} r_1 & -r_2 & \cdots & 0 \\ 0 & r_2 & -r_3 & \vdots \\ \vdots & \vdots & \ddots & \\ -r_1 & 0 & \cdots & r_N \end{bmatrix}}_{C} \begin{bmatrix} \Delta r_1 \\ \Delta r_2 \\ \vdots \\ \Delta r_N \end{bmatrix} =$$

$$C \begin{bmatrix} \Delta r_1 \\ \Delta r_2 \\ \vdots \\ \Delta r_N \end{bmatrix}$$

Positioning accuracy. Assuming the average measurement errors are zero, the covariance of the measurement errors can be expressed as $$Q_r = \text{average of} \left\{ \begin{bmatrix} \Delta r_1 \\ \Delta r_2 \\ \vdots \\ \Delta r_N \end{bmatrix} [\Delta r_1 \quad \Delta r_2 \quad \ldots \quad \Delta r_N] \right\} \tag{31}$$

The covariance of the errors in calculation of the position x, y & z, is similarly defined as $$Q_x = \text{average of} \left\{ \begin{bmatrix} \Delta x \\ \Delta y \\ \Delta z \end{bmatrix} [\Delta x \quad \Delta y \quad \Delta z] \right\} \tag{32}$$

Then it follows from (30) that the covariance of the position errors is related to the measurement errors by $$Q_x = C Q_r C^T \tag{33}$$

Formula (33) defines the resolution or accuracy in the calculation of the position in terms of covariance $Q_x$. The standard deviations of the resolution is given by $|\sqrt{Q_x}|$, which is the square root of the covariance. The variance depends on the matrix C, which relies on the locations of base stations ($x_i$'s, $y_i$'s & $z_i$'s) and their ranges ($r_i$'s) to the navigation unit. That is, positioning accuracy depends on the configuration of BS's location and the current position of the navigation unit. As discussed above, by placing one base station or the navigation unit out of the plane of the remaining base stations, the accuracy can be increased.

Illustration of Ranging & Positioning Accuracy. In practice, UWB RAC equipment will be tested and calibrated via experiments and correlating it with known measurements. Therefore well calibrated equipment can be as accurate in calibration as its ranging resolution. Referring to a prior example, a 350 Mbits/s chiprate UWB signal could be oversampled at a rate of 1.75 Gbits/s (five times the chiprate), so that the PN correlation yield a ranging resolution of about 0.1713 meter. For example, the resolution can be treated as the standard deviation; and its covariance would be 0.02934 m². Since each UWB RAC receivers are independent, the ranging covariance $Q_r$ becomes a diagonal matrix with 0.02934 as elements. The positioning accuracy is then reflected in the positioning covariance $Q_x = C Q_r C^T$, where C depends $x_i$'s, $y_i$'s & $z_i$'s and $r_i$'s. For example, let the $\{x_i, y_i, z_i\}$ of the $BS_i$, $i=1, \ldots, 5$, be located at ad hoc network coordinates of $\{0, 0, 0\}$, $\{1000, 0, 0\}$, $\{1000, 1000, 0\}$, $\{0\ 1000, 1000\}$ & $\{1000, 1000, 1000\}$, with the coordinates represents meters from the origin. Let the navigation unit be located at $\{400\ 500\ 600\}$, such that $\{r_i\}$ is $\{877.50\}$, $\{984.89\}$ $\{984.89\}$, $\{754.98\}$ & $\{877.50\}$. Then the position error covariance results in $$Q_x = C Q_r C^T = \begin{bmatrix} 0.0226 & -0.0142 & 0.0142 \\ -0.0142 & 0.0569 & -0.0427 \\ 0.0142 & -0.04270 & 0.0511 \end{bmatrix}$$

The standard deviations in the position errors $\{\Delta x, \Delta y, \Delta z\}$ can be deduced from the square roots of the diagonal elements of $Q_x$ as $\{0.150, 0.239, 0.226\}$ meters, which typify the possible accuracy in the position calculation. Note that accuracy is improved if higher over-sampling rate is employed. For example, the position error standard deviations would reduce to {0.015, 0.024, 0.023} meters, when an over-sampling rate of 17.5 Gbits/s is used.

Update Rate. The update rate for the UWB RAC TOA/TDOA methods depends on the distances between the stations and navigation unit, and the performance of computing equipment. The update rate (updates/second) can be estimated from $$F_{Update} = \left(1 + \sum_{i=1}^{N} (i-1)\right) NT_{FlightMax} + T_{Processing}$$

where $T_{FlightMax}$ is the maximum flight time between stations/navigation units, and $T_{Processing}$ is the electronics and computation time. For an operation area spreading over 1 km using current technology, an estimate of the update rate is at least about 200 location update per second is possible. Of course, slower update rates may also be used to suitably meet the practical requirements of any base station or navigation unit. For example update rates of about 25 times/sec, about 50 times/sec, about 100, times/sec, about 150 times/sec and rates between these rates may be suitable.

In another embodiment, the systems and devices of the present invention comprises a management functionality, a monitoring functionality, a coordinate support functionality and navigation functionality. The management functionality includes initializing the coordinate system and maintaining its consistency. This functionality can be implemented to operate fully autonomously or with operator assistant. The monitoring functionality includes diagnostic features for a system operator, central command, or for system health monitoring purposes. The coordinate support functionality includes acquiring a position of the base station relative to a local or global coordinate to be used as a reference position for the navigation unit. The navigation functionality includes calculating the position of the navigation unit and is typically implemented on the navigation unit itself. Each of the these functionalities may be implemented in a single component or across several components, whether those components are located near each other or remote from each other. Further, each component may implement a portion of more than one functionality.

It will be further appreciated that functions or structures of a plurality of components or steps may be combined into a single component or step, or the functions or structures of one-step or component may be split among plural steps or components. The present invention contemplates all of these combinations. Unless stated otherwise, dimensions and geometries of the various structures depicted herein are not intended to be restrictive of the invention, and other dimensions or geometries are possible. Plural structural components or steps may be provided by a single integrated structure or step. Alternatively, a single integrated structure or step might be divided into separate plural components or steps. In addition, while a feature of the present invention may have been described in the context of only one of the illustrated embodiments, such feature may be combined with one or more other features of other embodiments, for any given application. It will also be appreciated from the above that the fabrication of the unique structures herein and the operation thereof also constitute methods in accordance with the present invention.

The explanations and illustrations presented herein are intended to acquaint others skilled in the art with the invention, its principles, and its practical application. Those skilled in the art may adapt and apply the invention in its numerous forms, as may be best suited to the requirements of a particular use. Accordingly, the specific embodiments of the present invention as set forth are not intended as being exhaustive or limiting of the invention. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes.

What is claimed is:

1. A navigation unit comprising:
   a transceiver for transmitting and receiving ultra wideband signals,
   a central processing unit for performing operations,
   a power source for powering the transceiver and the central processing unit, and
   software stored on and executed by the central processing unit for diagnosing and managing the navigation unit, and for calculating position of the navigation unit using range measurements to and between a plurality of base stations, wherein the plurality of base stations is initialized to determine their relative locations to each other in a coordinate system wherein, during initializing, a first base station of the plurality of base stations sends an ultra wideband signal to a second base station and a third base station of the plurality of base stations to determine a distance between the first base station and the second base station and a distance between the first base station and the third base station and wherein the second base station sends an ultra wideband signal to the third base station to determine a distance between the second base station and the third base station;
   determining the range measurements, at the navigation unit, by measuring the time of arrival of at least one ultra wideband signal from each of the plurality of base stations;
   calculating directly the location of the navigation unit relative to the plurality of base stations, where the plurality of base stations is at least three when a time of arrival technique is used and wherein the plurality of base stations is at least four when a time difference of arrival technique is used.

2. The navigation unit of claim 1, wherein the transceiver, the central processing unit, and the power source are contained within the same housing.

3. The navigation unit of claim 1, further comprising a global positioning system receiver for determining the location of the navigation unit.

4. The navigation unit of claim 1, wherein the navigation unit communicates data using the ultra wideband transceiver.

5. The navigation unit of claim 4, wherein the data contains range measurements.

6. The navigation unit of claim 1, comprising an algorithm for determining accuracy of the navigation unit's position in relation to the plurality of base stations.

7. The navigation unit of claim 1, wherein the power source comprises a rechargeable battery.

8. The navigation unit of claim 1, wherein the power source comprises a wind turbine, solar panel, turbine, or generator.

9. The navigation unit of claim 1, wherein the software program monitors power level.

10. The navigation unit of claim 1, comprising a temperature sensor used for correcting variations in range measurement due to ambient temperature.

11. The navigation unit of claim 1, comprising a motion sensor used for detecting if the navigation unit has moved.

12. The navigation unit of claim 1, wherein the software program conserves power used by the navigation unit by entering the navigation unit into a low-power sleep mode.

13. The navigation unit of claim 1, comprising a direction indicator.

14. The navigation unit of claim 1, comprising health monitors.

15. The navigation unit of claim 1, comprising sensors for measuring ambient conditions.

16. The navigation unit of claim 1, using an explicit closed-form triangulation calculation to determine the location of the navigation unit.

17. The navigation unit of claim 1, comprising a separate communication link for communicating data.

18. The navigation unit of claim 17, wherein the separate communication link is a wireless modem.

19. The navigation unit of claim 17, wherein the data contains range measurements.

20. The navigation unit of claim 1, comprising a motion sensor used for measuring the movement of the navigation unit.

21. A base station comprising:
a transceiver for transmitting and receiving ultra wideband signals,
a central processing unit for performing operations,
a power source for powering the transceiver and the central processing unit, and
software stored on and executed by the central processing unit for diagnosing and managing the base station,
wherein the base station transmits range measurements to one of a plurality of base stations or one or more navigation units, wherein the plurality of base stations is initialized to determine their relative locations to each other in a coordinate system wherein, during initializing, the base station sends an ultra wideband signal to a second base station and a third base station of the plurality of base stations to determine a distance between the base station and the second base station and a distance between the base station and the third base station and wherein the second base station sends an ultra wideband signal to the third base station to determine a distance between the second base station and the third base station;
determining the range measurements, at the base station, by measuring the time of arrival of at least one ultra wideband signal from each of the plurality of base stations;
and transmitting, at the base station, the range measurement to the requesting base station or navigation unit.

22. The base station of claim 21, wherein the transceiver, the central processing unit, and the power source are contained within the same housing.

23. The base station of claim 21, further comprising a global positioning system receiver for determining the location of the base station.

24. The base station of claim 21, wherein the base station communicates data using the ultra wideband transceiver.

25. The base station of claim 21, wherein the power source comprises a rechargeable battery.

26. The base station of claim 21, wherein the power source comprises a wind turbine, solar panel, turbine, or generator.

27. The base station of claim 21, comprising an interface for entry of the location of the base station.

28. The base station of claim 21, wherein the software program monitors power level.

29. The base station of claim 21, comprising a temperature sensor used for correcting variations in range measurement due to ambient temperature.

30. The base station of claim 21, comprising a motion sensor used for detecting if the base station has moved.

31. The base station it of claim 21, wherein the software program conserves power used by the base station by entering the base station into a low-power sleep mode.

32. The base station of claim 21, comprising a direction indicator.

33. The base station of claim 21, comprising health monitors.

34. The base station of claim 21, comprising sensors for measuring ambient conditions.

35. The base station of claim 21, comprising a separate communication link for communicating data.

36. The base station of claim 21, wherein the separate communication link is a wireless modem.

37. The base station of claim 21, wherein the data contains range measurements.

38. The base station of claim 21, comprising a motion sensor used for measuring the movement of the base station.

* * * * *